US012713349B2

(12) United States Patent
Yang et al.

(10) Patent No.: US 12,713,349 B2
(45) Date of Patent: Aug. 18, 2026

(54) REDUCING THE POWER CONSUMPTION OF COMMUNICATION DEVICES

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Chen Luo, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 450 days.

(21) Appl. No.: 18/005,962

(22) PCT Filed: Jul. 20, 2021

(86) PCT No.: PCT/CN2021/107355

§ 371 (c)(1),
(2) Date: Jan. 18, 2023

(87) PCT Pub. No.: WO2022/017379

PCT Pub. Date: Jan. 27, 2022

(65) Prior Publication Data

US 2023/0232328 A1 Jul. 20, 2023

(30) Foreign Application Priority Data

Jul. 20, 2020 (CN) ......................... 202010701859.0

(51) Int. Cl.
*H04W 52/02* (2009.01)

(52) U.S. Cl.
CPC ... *H04W 52/0229* (2013.01); *H04W 52/0219* (2013.01)

(58) Field of Classification Search
CPC ......... H04W 52/0229; H04W 52/0219; H04W 52/0216; H04W 52/0235; H04W 52/028;
(Continued)

(56) References Cited

U.S. PATENT DOCUMENTS

2008/0170526 A1* 7/2008 Narang ............ H04W 52/0216 455/574
2018/0063789 A1* 3/2018 Chen ................ H04W 52/0229
(Continued)

FOREIGN PATENT DOCUMENTS

CN 109936868 A 6/2019
CN 110475320 A 11/2019
(Continued)

OTHER PUBLICATIONS

International Search Report for PCT/CN2021/107355 issued on Oct. 8, 2021 and its English Translation provided by WIPO.
(Continued)

*Primary Examiner* — Ian N Moore
*Assistant Examiner* — Latresa A Mccallum
(74) *Attorney, Agent, or Firm* — Ladas & Parry, LLP

(57) ABSTRACT

The present disclosure discloses a signal receiving and sending method, a node and a network side device. The information receiving method includes obtaining target information, wherein the target information includes first information and/or second information; obtaining wake-up information according to the target information, wherein the wake-up information obtained according to the first information includes at least one of area-level wake-up information, cell-level wake-up information, or node group-level wake-up information, wake-up information obtained according to the second information includes at least one of the node group-level wake-up information and node-level
(Continued)

wake-up information; performing waking up or continuing to sleep according to indication of the wake-up information.

13 Claims, 6 Drawing Sheets

(58) Field of Classification Search
CPC .... H04W 76/28; H04L 5/0023; H04L 5/0044; H04L 5/0053; H04L 5/008; H04L 5/009
See application file for complete search history.

(56) References Cited

U.S. PATENT DOCUMENTS

| | | | | |
|---|---|---|---|---|
| 2019/0090193 | A1* | 3/2019 | Liu | H04W 52/028 |
| 2019/0159128 | A1* | 5/2019 | Lin | H04W 68/02 |
| 2019/0254110 | A1 | 8/2019 | He et al. | |
| 2020/0029302 | A1* | 1/2020 | Cox | H04W 52/0216 |
| 2020/0252780 | A1* | 8/2020 | McClendon, IV | H04W 4/90 |
| 2020/0322918 | A1* | 10/2020 | Shih | H04W 76/11 |
| 2021/0058895 | A1 | 2/2021 | Gao et al. | |
| 2021/0092744 | A1* | 3/2021 | Khoshnevisan | H04W 72/23 |
| 2022/0210866 | A1* | 6/2022 | He | H04L 5/0048 |
| 2022/0264461 | A1* | 8/2022 | Chen | H04W 72/23 |
| 2022/0330151 | A1* | 10/2022 | Yang | H04W 52/0212 |

FOREIGN PATENT DOCUMENTS

| | | | |
|---|---|---|---|
| CN | 110536386 | A | 12/2019 |
| WO | 2020063657 | A1 | 4/2020 |
| WO | 2020089515 | A1 | 5/2020 |

OTHER PUBLICATIONS

Written Opinion for PCT/CN2021/107355 issued on Oct. 8, 2021 and its English Translation provided by WIPO.
International Report on Patentibily for PCT/CN2021/107355 issued on Jan. 24, 2023 and its English translation provided by WIPO.
First Office Action and search report for the corresponding Chinese Patent Application No. 202010701859.0 issued on Feb. 7, 2023, and its English translation provided by Foreign Associate.
Extended European Search Report for European Patent Application No. 21845870.1 issued by the European Patent Office on May 14, 2024.

* cited by examiner

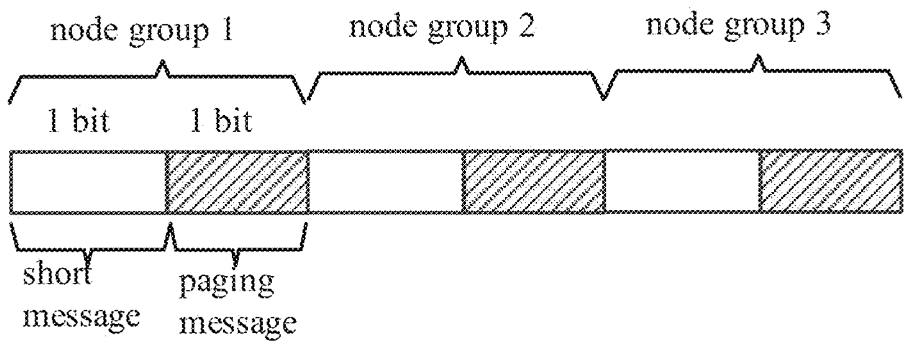

FIG. 3 area info | Node wakes up to receive area-level info
node group 1 | Node group 1 wakes up to receive node group-level info
node group 2 | Node group 2 wakes up to receive node group-level info
node group 3 | Node group 3 wakes up to receive node group-level info
node group 4 | Node group 4 wakes up to receive node group-level info
node group 5 | Node group 5 wakes up to receive node group-level info
node group 1 | Node group 6 wakes up to receive node group-level info

FIG. 4

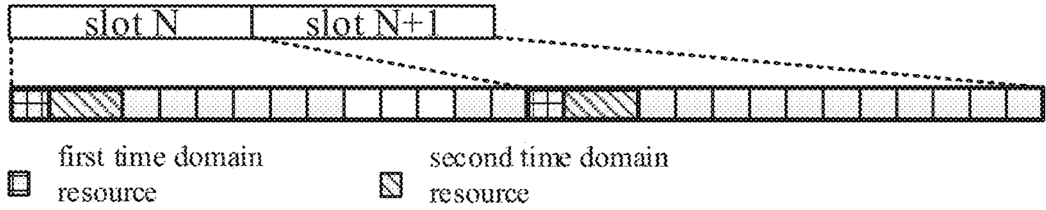

FIG. 5

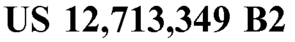
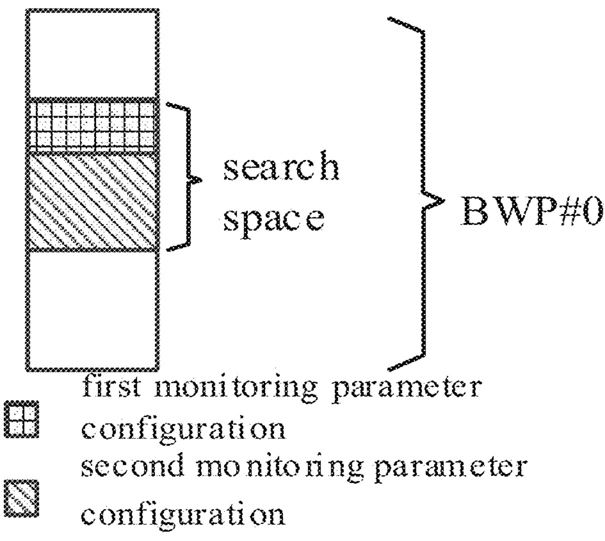
FIG. 8
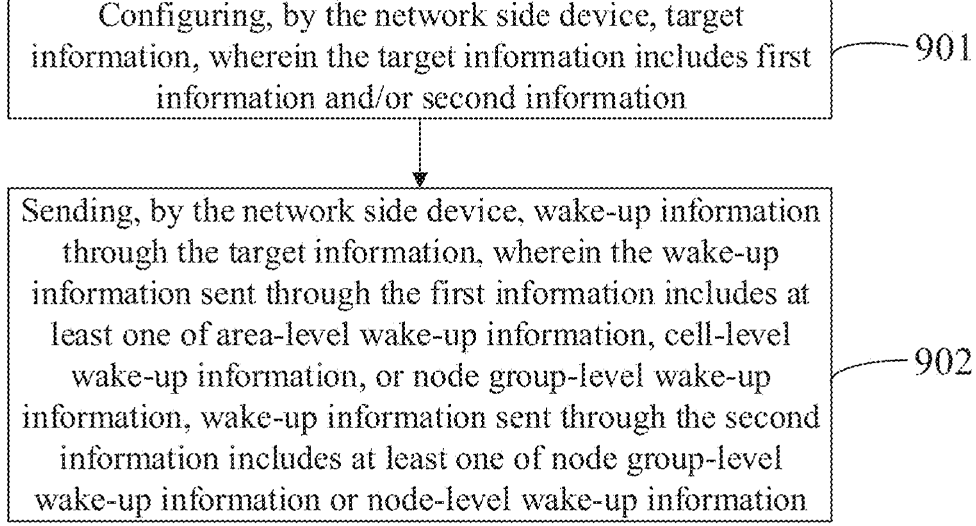
FIG. 9

REDUCING THE POWER CONSUMPTION OF COMMUNICATION DEVICES

CROSS-REFERENCE TO RELATED APPLICATIONS

This application is the U.S. national phase of PCT Application No. PCT/CN2021/107355 filed on Jul. 20, 2021, which claims priority to the Chinese patent application No. 202010701859.0 filed on Jul. 20, 2020, the disclosures of which are incorporated herein by reference in their entireties.

TECHNICAL FIELD

The present disclosure relates to the field of communications technology, in particular to a signal transmission method, a node and a network side device.

BACKGROUND

Communication devices (such as terminals) still have some ineffective power consumption, so how to further reduce the power consumption of communication devices is still an important research direction.

SUMMARY

Embodiments of the present disclosure provide a signal receiving and sending method, a node and a network side device, so as to solve the problem of high power consumption of the communication device.

In order to achieve the above object, an embodiment of the present disclosure provides a signal receiving method, applied to a node, including: obtaining target information, wherein the target information includes first information and/or second information; obtaining wake-up information according to the target information, wherein the wake-up information obtained according to the first information includes at least one of area-level wake-up information, cell-level wake-up information, or node group-level wake-up information, wake-up information obtained according to the second information includes at least one of the node group-level wake-up information and node-level wake-up information; performing waking up or continuing to sleep according to indication of the wake-up information.

Optionally, after the obtaining wake-up information according to the target information, the method further includes: determining whether to receive physical downlink shared channel (PDSCH) according to the indication of the wake-up information.

Optionally, the determining whether to receive the PDSCH according to the indication of the wake-up information includes: if the wake-up information obtained according to the target information includes at least one of the node group-level wake-up information or the node-level wake-up information, receiving PDSCH scheduled by downlink control information (DCI) scrambled by Paging-Radio Network Temporary Identity (P-RNTI); otherwise, not receiving the PDSCH scheduled by the DCI scrambled by the P-RNTI.

Optionally, the first information includes at least one of time domain resource information, frequency domain resource information, spatial domain resource information, sequence information, bit information, or monitoring parameter configuration information; the second information includes at least one of time domain resource information, frequency domain resource information, spatial domain resource information, sequence information, bit information, or monitoring parameter configuration information.

Optionally, the area-level wake-up information is used to indicate at least one of the following:

- whether area-level information exists;
- whether to wake up all nodes in a target area to receive the area-level information;
- waking up all nodes in the target area to receive the area-level information;
- a type of information to be received including the area-level information;
- a type of a short message;
- a type of a system message to be updated; or
- whether to update the system message.

Optionally, the cell-level wake-up information is used to indicate at least one of the following:

- whether cell-level information exists;
- whether to wake up all nodes in a target area to receive the cell-level information;
- waking up all nodes in the target area to receive the cell-level information;
- a type of information to be received including the cell-level information;
- a type of a short message;
- a type of a system message to be updated; or
- whether to update the system message.

Optionally, the node group-level wake-up information is used to indicate at least one of the following:

- whether node group-level information exists;
- whether to wake up all nodes in a target node group to receive the node group-level information;
- waking up all nodes in the target node group to receive the node group-level information;
- a type of information to be received including the node group-level information;
- a serial number of a node group to be woken up; or
- whether to wake up at least one node group.

Optionally, the node-level wake-up information is used to indicate at least one of the following:

- whether node-level information exists;
- whether to wake up a target node to receive the node-level information;
- waking up the target node to receive the node-level information;
- a type of information to be received including the node-level information;
- a serial number of a node to be woken up; or
- whether to wake up at least one node.

Optionally, the area-level information includes at least one of a broadcast message, the short message, or other information of PDSCH scheduled by DCI not scrambled by P-RNTI.

Optionally, the cell-level information includes at least one of a broadcast message, the short message, or other information of PDSCH scheduled by DCI not scrambled by P-RNTI.

Optionally, the node group-level information includes at least one of a broadcast message, the short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message;

wherein the first message is used to instruct the node to stop monitoring Paging Occasion (PO).

Optionally, the first information and the second information in the target information are arranged alternately or sequentially.

Optionally, when both the first information and the second information in the target information are time domain resource information, and the first information and the second information are arranged alternately, a time domain resource indicated by the first information and a time domain resource indicated by the second information are alternately arranged;

when both the first information and the second information in the target information are time domain resource information, and the first information and the second information are arranged sequentially, all time domain resources indicated by the first information are arranged before or after the time domain resource indicated by the second information;

when both the first information and the second information in the target information are frequency domain resource information, and the first information and the second information are arranged alternately, a frequency domain resource indicated by the first information and a frequency domain resource indicated by the second information are arranged alternately;

when both the first information and the second information in the target information are frequency domain resource information, and the first information and the second information are arranged sequentially, frequencies of all frequency domain resources indicated by the first information are greater than or less than frequency domain resources indicated by the second information;

when both the first information and the second information in the target information are spatial domain resource information, and the first information and the second information are arranged alternately, a spatial domain resource indicated by the first information and a spatial domain resource indicated by the second information are arranged alternately in terms of a serial number;

when both the first information and the second information in the target information are spatial domain resource information, and the first information and the second information are arranged sequentially, serial numbers of all spatial domain resources indicated by the first information are before or after a serial number of the spatial domain resource indicated by the second information;

when both the first information and the second information in the target information are bit information, and the first information and the second information are arranged alternately, a bit indicated by the first information and a bit indicated by the second information are arranged alternately;

when both the first information and the second information in the target information are bit information, and the first information and the second information are arranged sequentially, all bits indicated by the first information are before or after the bit indicated by the second information.

Optionally, the monitoring parameter includes at least one of a core resource set (CORESET)resource, a search space resource, a physical downlink control channel (PDCCH) candidate resource, a symbol of the CORESET resource, or a resource block of the CORESET resource.

An embodiment of the present disclosure provides a signal sending method, applied to a network side device, including: configuring target information, wherein the target information includes first information and/or second information; sending wake-up information through the target information, wherein the wake-up information sent through the first information includes at least one of area-level wake-up information, cell-level wake-up information, or node group-level wake-up information, wake-up information sent through the second information includes at least one of the node group-level wake-up information or node-level wake-up information.

Optionally, the first information includes at least one of time domain resource information, frequency domain resource information, spatial domain resource information, sequence information, bit information, or monitoring parameter configuration information; the second information includes at least one of time domain resource information, frequency domain resource information, spatial domain resource information, sequence information, bit information, or monitoring parameter configuration information.

Optionally, the area-level wake-up information is used to indicate at least one of the following:

whether area-level information exists;

whether to wake up all nodes in a target area to receive the area-level information;

waking up all nodes in the target area to receive the area-level information;

a type of information to be received including the area-level information;

a type of a short message;

a type of a system message to be updated; or whether to update the system message.

Optionally, the cell-level wake-up information is used to indicate at least one of the following:

whether cell-level information exists;

whether to wake up all nodes in a target area to receive the cell-level information;

waking up all nodes in the target area to receive the cell-level information;

a type of information to be received including the cell-level information;

a type of a short message;

a type of a system message to be updated; or whether to update the system message.

Optionally, the node group-level wake-up information is used to indicate at least one of the following:

whether node group-level information exists;

whether to wake up all nodes in a target node group to receive the node group-level information;

waking up all nodes in the target node group to receive the node group-level information;

a type of information to be received including the node group-level information;

a serial number of a node group to be woken up; or whether to wake up at least one node group.

Optionally, the node-level wake-up information is used to indicate at least one of the following:

whether node-level information exists;

whether to wake up a target node to receive the node-level information;

waking up the target node to receive the node-level information;

a type of information to be received including the node-level information;

a serial number of a node to be woken up; or whether to wake up at least one node.

Optionally, the area-level information includes at least one of a broadcast message, the short message, or other information of PDSCH scheduled by DCI not scrambled by P-RNTI.

Optionally, the cell-level information includes at least one of a broadcast message, the short message, or other information of PDSCH scheduled by DCI not scrambled by P-RNTI.

Optionally, the node group-level information includes at least one of a broadcast message, the short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message; wherein the first message is used to instruct the node to stop monitoring Paging Occasion (PO).

Optionally, the first information and the second information in the target information are arranged alternately or sequentially.

Optionally, the target information is based on high layer signaling configuration, radio resource control (RRC) signaling configuration, dynamic signaling configuration, predefined configuration or broadcast configuration.

An embodiment of the present disclosure provides a node, including: a first obtaining module, configured to obtain target information, wherein the target information includes first information and/or second information; a second obtaining module, configured to obtain wake-up information according to the target information, wherein the wake-up information obtained according to the first information includes at least one of area-level wake-up information, cell-level wake-up information, or node group-level wake-up information, wake-up information obtained according to the second information includes at least one of the node group-level wake-up information and node-level wake-up information; a performing module, configured to perform waking up or continuing to sleep according to indication of the wake-up information.

Optionally, the node further includes: a receiving module, configured to determine whether to receive physical downlink shared channel (PDSCH) according to the indication of the wake-up information.

Optionally, the receiving module is configured to: if the wake-up information obtained according to the target information includes at least one of the node group-level wake-up information or the node-level wake-up information, receive PDSCH scheduled by downlink control information (DCI) scrambled by Paging-Radio Network Temporary Identity (P-RNTI); otherwise, not receive the PDSCH scheduled by the DCI scrambled by the P-RNTI.

Optionally, the first information includes at least one of time domain resource information, frequency domain resource information, spatial domain resource information, sequence information, bit information, or monitoring parameter configuration information; the second information includes at least one of time domain resource information, frequency domain resource information, spatial domain resource information, sequence information, bit information, or monitoring parameter configuration information.

Optionally, the area-level wake-up information is used to indicate at least one of the following:

- whether area-level information exists;
- whether to wake up all nodes in a target area to receive the area-level information;
- waking up all nodes in the target area to receive the area-level information;
- a type of information to be received including the area-level information;
- a type of a short message;
- a type of a system message to be updated; or
- whether to update the system message.

Optionally, the cell-level wake-up information is used to indicate at least one of the following:

- whether cell-level information exists;
- whether to wake up all nodes in a target area to receive the cell-level information;
- waking up all nodes in the target area to receive the cell-level information;
- a type of information to be received including the cell-level information;
- a type of a short message;
- a type of a system message to be updated; or
- whether to update the system message.

Optionally, the node group-level wake-up information is used to indicate at least one of the following:

- whether node group-level information exists;
- whether to wake up all nodes in a target node group to receive the node group-level information;
- waking up all nodes in the target node group to receive the node group-level information;
- a type of information to be received including the node group-level information;
- a serial number of a node group to be woken up; or
- whether to wake up at least one node group.

Optionally, the node-level wake-up information is used to indicate at least one of the following:

- whether node-level information exists;
- whether to wake up a target node to receive the node-level information;
- waking up the target node to receive the node-level information;
- a type of information to be received including the node-level information;
- a serial number of a node to be woken up; or
- whether to wake up at least one node.

Optionally, the area-level information includes at least one of a broadcast message, the short message, or other information of PDSCH scheduled by DCI not scrambled by P-RNTI.

Optionally, the cell-level information includes at least one of a broadcast message, the short message, or other information of PDSCH scheduled by DCI not scrambled by P-RNTI.

Optionally, the node group-level information includes at least one of a broadcast message, the short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message; wherein the first message is used to instruct the node to stop monitoring Paging Occasion (PO).

Optionally, the first information and the second information in the target information are arranged alternately or sequentially.

Optionally, when both the first information and the second information in the target information are time domain resource information, and the first information and the second information are arranged alternately, a time domain resource indicated by the first information and a time domain resource indicated by the second information are alternately arranged;

when both the first information and the second information in the target information are time domain resource information, and the first information and the second information are arranged sequentially, all time domain resources indicated by the first information are arranged before or after the time domain resource indicated by the second information;

when both the first information and the second information in the target information are frequency domain resource information, and the first information and the second information are arranged alternately, a frequency domain resource indicated by the first information and a frequency domain resource indicated by the second information are arranged alternately;

when both the first information and the second information in the target information are frequency domain resource information, and the first information and the second information are arranged sequentially, frequencies of all frequency domain resources indicated by the first information are greater than or less than frequency domain resources indicated by the second information;

when both the first information and the second information in the target information are spatial domain resource information, and the first information and the second information are arranged alternately, a spatial domain resource indicated by the first information and a spatial domain resource indicated by the second information are arranged alternately in terms of a serial number;

when both the first information and the second information in the target information are spatial domain resource information, and the first information and the second information are arranged sequentially, serial numbers of all spatial domain resources indicated by the first information are before or after a serial number of the spatial domain resource indicated by the second information;

when both the first information and the second information in the target information are bit information, and the first information and the second information are arranged alternately, a bit indicated by the first information and a bit indicated by the second information are arranged alternately;

when both the first information and the second information in the target information are bit information, and the first information and the second information are arranged sequentially, all bits indicated by the first information are before or after the bit indicated by the second information.

Optionally, the monitoring parameter includes at least one of a core resource set (CORESET)resource, a search space resource, a physical downlink control channel (PDCCH) candidate resource, a symbol of the CORESET resource, or a resource block of the CORESET resource.

An embodiment of the present disclosure provides a network side device, including: a configuration module, configured to configure target information, wherein the target information includes first information and/or second information; a sending module, configured to send wake-up information through the target information, wherein the wake-up information sent through the first information includes at least one of area-level wake-up information, cell-level wake-up information, or node group-level wake-up information, wake-up information sent through the second information includes at least one of the node group-level wake-up information or node-level wake-up information.

Optionally, the first information includes at least one of time domain resource information, frequency domain resource information, spatial domain resource information, sequence information, bit information, or monitoring parameter configuration information; the second information includes at least one of time domain resource information, frequency domain resource information, spatial domain resource information, sequence information, bit information, or monitoring parameter configuration information.

Optionally, the area-level wake-up information is used to indicate at least one of the following:

whether area-level information exists;

whether to wake up all nodes in a target area to receive the area-level information;

waking up all nodes in the target area to receive the area-level information;

a type of information to be received including the area-level information;

a type of a short message;

a type of a system message to be updated; or whether to update the system message.

Optionally, the cell-level wake-up information is used to indicate at least one of the following:

whether cell-level information exists;

whether to wake up all nodes in a target area to receive the cell-level information;

waking up all nodes in the target area to receive the cell-level information;

a type of information to be received including the cell-level information;

a type of a short message;

a type of a system message to be updated; or whether to update the system message.

Optionally, the node group-level wake-up information is used to indicate at least one of the following:

whether node group-level information exists;

whether to wake up all nodes in a target node group to receive the node group-level information;

waking up all nodes in the target node group to receive the node group-level information;

a type of information to be received including the node group-level information;

a serial number of a node group to be woken up; or whether to wake up at least one node group.

Optionally, the node-level wake-up information is used to indicate at least one of the following:

whether node-level information exists;

whether to wake up a target node to receive the node-level information;

waking up the target node to receive the node-level information;

a type of information to be received including the node-level information;

a serial number of a node to be woken up; or whether to wake up at least one node.

Optionally, the area-level information includes at least one of a broadcast message, the short message, or other information of PDSCH scheduled by DCI not scrambled by P-RNTI.

Optionally, the cell-level information includes at least one of a broadcast message, the short message, or other information of PDSCH scheduled by DCI not scrambled by P-RNTI.

Optionally, the node group-level information includes at least one of a broadcast message, the short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message; wherein the first message is used to instruct the node to stop monitoring Paging Occasion (PO).

Optionally, the first information and the second information in the target information are arranged alternately or sequentially.

Optionally, the target information is based on high layer signaling configuration, radio resource control (RRC) signaling configuration, dynamic signaling configuration, predefined configuration or broadcast configuration.

An embodiment of the present disclosure provides a node, including: a transceiver, a memory, a processor, and a computer program stored on the memory and executed by the processor, wherein the processor executes the computer program to implement the following steps: obtaining target information, wherein the target information includes first information and/or second information; obtaining wake-up information according to the target information, wherein the wake-up information obtained according to the first information includes at least one of area-level wake-up information, cell-level wake-up information, or node group-level wake-up information, wake-up information obtained according to the second information includes at least one of the node group-level wake-up information and node-level wake-up information; performing waking up or continuing to sleep according to indication of the wake-up information.

Optionally, when the processor executes the computer program to implement the following steps: after the obtaining wake-up information according to the target information, the processor further implements the following step: determining whether to receive physical downlink shared channel (PDSCH) according to the indication of the wake-up information.

Optionally, the processor executes the computer program to implement the following steps: the determining whether to receive the PDSCH according to the indication of the wake-up information comprises: if the wake-up information obtained according to the target information includes at least one of the node group-level wake-up information or the node-level wake-up information, receiving PDSCH scheduled by downlink control information (DCI) scrambled by Paging-Radio Network Temporary Identity (P-RNTI); otherwise, not receiving the PDSCH scheduled by the DCI scrambled by the P-RNTI.

Optionally, the first information includes at least one of time domain resource information, frequency domain resource information, spatial domain resource information, sequence information, bit information, or monitoring parameter configuration information; the second information includes at least one of time domain resource information, frequency domain resource information, spatial domain resource information, sequence information, bit information, or monitoring parameter configuration information.

Optionally, the area-level wake-up information is used to indicate at least one of the following:

whether area-level information exists;

whether to wake up all nodes in a target area to receive the area-level information;

waking up all nodes in the target area to receive the area-level information;

a type of information to be received including the area-level information;

a type of a short message;

a type of a system message to be updated; or whether to update the system message.

Optionally, the cell-level wake-up information is used to indicate at least one of the following:

whether cell-level information exists;

whether to wake up all nodes in a target area to receive the cell-level information;

waking up all nodes in the target area to receive the cell-level information;

a type of information to be received including the cell-level information;

a type of a short message;

a type of a system message to be updated; or whether to update the system message.

Optionally, the node group-level wake-up information is used to indicate at least one of the following:

whether node group-level information exists;

whether to wake up all nodes in a target node group to receive the node group-level information;

waking up all nodes in the target node group to receive the node group-level information;

a type of information to be received including the node group-level information;

a serial number of a node group to be woken up; or whether to wake up at least one node group.

Optionally, the node-level wake-up information is used to indicate at least one of the following:

whether node-level information exists;

whether to wake up a target node to receive the node-level information;

waking up the target node to receive the node-level information;

a type of information to be received including the node-level information;

a serial number of a node to be woken up; or whether to wake up at least one node.

Optionally, the area-level information includes at least one of a broadcast message, the short message, or other information of PDSCH scheduled by DCI not scrambled by P-RNTI.

Optionally, the cell-level information includes at least one of a broadcast message, the short message, or other information of PDSCH scheduled by DCI not scrambled by P-RNTI.

Optionally, the node group-level information includes at least one of a broadcast message, the short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message; wherein the first message is used to instruct the node to stop monitoring Paging Occasion (PO).

Optionally, the first information and the second information in the target information are arranged alternately or sequentially.

Optionally, when both the first information and the second information in the target information are time domain resource information, and the first information and the second information are arranged alternately, a time domain resource indicated by the first information and a time domain resource indicated by the second information are alternately arranged;

when both the first information and the second information in the target information are time domain resource information, and the first information and the second information are arranged sequentially, all time domain resources indicated by the first information are arranged before or after the time domain resource indicated by the second information;

when both the first information and the second information in the target information are frequency domain resource information, and the first information and the second information are arranged alternately, a frequency domain resource indicated by the first information and a frequency domain resource indicated by the second information are arranged alternately;

when both the first information and the second information in the target information are frequency domain resource information, and the first information and the second information are arranged sequentially, frequencies of all frequency domain resources indicated by the first information are greater than or less than frequency domain resources indicated by the second information;

when both the first information and the second information in the target information are spatial domain resource information, and the first information and the second information are arranged alternately, a spatial domain resource indicated by the first information and a spatial domain resource indicated by the second information are arranged alternately in terms of a serial number;

when both the first information and the second information in the target information are spatial domain resource information, and the first information and the second information are arranged sequentially, serial numbers of all spatial domain resources indicated by the first information are before or after a serial number of the spatial domain resource indicated by the second information;

when both the first information and the second information in the target information are bit information, and the first information and the second information are arranged alternately, a bit indicated by the first information and a bit indicated by the second information are arranged alternately;

when both the first information and the second information in the target information are bit information, and the first information and the second information are arranged sequentially, all bits indicated by the first information are before or after the bit indicated by the second information.

Optionally, the monitoring parameter includes at least one of a core resource set (CORESET)resource, a search space resource, a physical downlink control channel (PDCCH) candidate resource, a symbol of the CORESET resource, or a resource block of the CORESET resource.

An embodiment of the present disclosure provides a network side device, comprising: a transceiver, a memory, a processor, and a computer program stored in the memory and executed by the processor, wherein, the processor executes the computer program to implement the following steps: configuring target information, wherein the target information includes first information and/or second information; sending wake-up information through the target information, wherein the wake-up information sent through the first information includes at least one of area-level wake-up information, cell-level wake-up information, or node group-level wake-up information, wake-up information sent through the second information includes at least one of the node group-level wake-up information or node-level wake-up information.

Optionally, the target information is based on high-layer signaling configuration, RRC signaling configuration, dynamic signaling configuration, pre-defined configuration or broadcast configuration.

An embodiment of the present disclosure provides a computer-readable storage medium, on which a computer program is stored, wherein the processor executes the computer program to implement the steps of the signal receiving method, or the steps of the signal sending method.

In the embodiment of the present disclosure, the first information and/or the second information may be used to indicate different levels of wake-up information, so that the node (including the terminal) side can accurately know the level of the message to be received. If it is an area-level or cell-level message, all nodes in the area or cell need to be woken up. However, if it is a node-level or node group-level message, only the indicated node needs to be woken up, and other nodes do not need to be woken up, so that the unnecessary power consumption of the node caused by unnecessary wakeup can be reduced. The embodiments of the present disclosure may be applicable to the wake-up indication of the monitoring of the Paging DCI in the RRC-Idle/Inactive state of the terminal.

In the embodiments of the present disclosure, the first information and/or the second information can be used to indicate different levels of wake-up information, so that the network side can indicate different levels of wake-up information separately. If it is area-level or cell-level wake-up information, they can only be indicated on one resource, and all nodes (including terminals) will monitor the resource, and there is no necessary to send area-level wake-up information or cell-level wake-up information to each node, which can greatly reduce the signaling overhead of the base station for the wake-up indication.

BRIEF DESCRIPTION OF THE DRAWINGS

FIG. 3 is another schematic diagram of a wake-up indication when the first information is the first bit information and the second information is the second bit information in an embodiment of the present disclosure;

FIG. 4 is a schematic diagram of a wake-up indication when the first information is the first sequence information and the second information is the second sequence information in an embodiment of the present disclosure;

FIG. 5 is a schematic diagram of a wake-up indication when the first information is the first time domain resource information and the second information is the second time domain resource information in an embodiment of the present disclosure;

FIG. 8 is a schematic diagram of a wake-up indication when the first information is the first monitoring parameter configuration information and the second information is the second monitoring parameter configuration information in an embodiment of the present disclosure;

FIG. 9 is a schematic flowchart of a signal sending method in an embodiment of the present disclosure;

DETAILED DESCRIPTION

Figure 1:
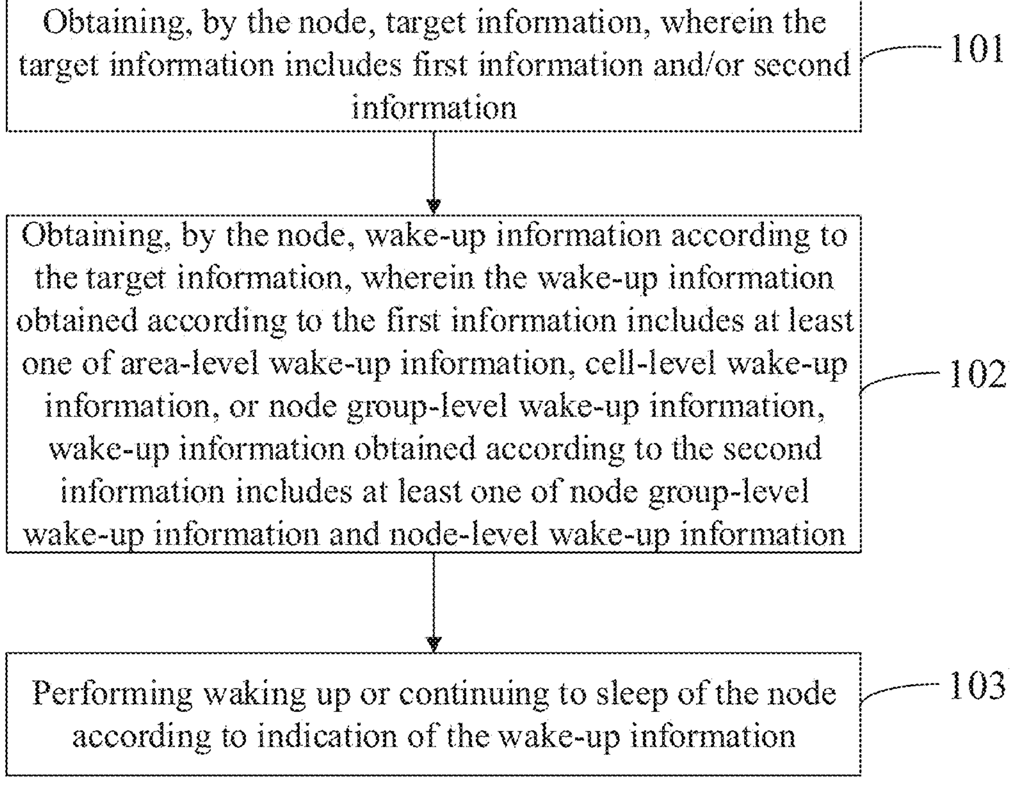
FIG. 1 is a schematic flowchart of a signal receiving method in an embodiment of the present disclosure.

In order to make the technical problems, technical solutions and advantages to be solved by the present disclosure clearer, the following will describe in detail with reference to the drawings and specific embodiments.

Related art defines the monitoring of paging under RRC-Idle/Inactive (RRC: radio resource control; Idle: idle state; Inactive: inactive state), mainly including the following information: system message update, alert messages and paging messages. The UE calculates the paging frame (PF) and Paging Occasion (PO) according to the parameter configuration. At PO time, the UE monitors downlink control information (DCI) scrambled by the paging RNTI (P-RNTI), then performs demodulation and decoding to obtain the physical downlink shared channel (PDSCH) carrying the paging message, after performing demodulation and decoding on PDSCH, obtains the UE list information used to record the Paging message to be received, queries the list, if the UE is in the list, obtains the Paging message carried by the PDSCH, otherwise, the UE does not obtain the paging message.

The messages contained in paging include the following parts according to different categories:

1. According to message types, the messages are divided into:

Short message, including system message update, alert message and first message, the first message is used to instruct to stop monitoring PO;

Paging message.

2. According to the scheduling of radio network temporary identity (RNTI), the messages are divided into:

Message indicating that DCI scrambled by P-RNTI is required to schedule PDSCH, such as paging messages;

Message indicating that DCI scrambled by P-RNTI is not required to schedule PDSCH, such as short messages.

3. According to the scope of the message, the messages are divided into:

Area-level messages: other system messages;

Cell-level messages: short messages;

Terminal-level messages (hereafter referred to as node-level messages): paging messages.

The monitoring of the Physical downlink control channel (PDCCH) is scrambled by P-RNTI. P-RNTI is shared by all UEs. The base station configures the monitoring cycle, the number of paging radio frames in each cycle, and the number of POs in each paging radio frame, there may be a plurality of UEs that need to monitor paging at the same PO time, as long as there is one UE with a paging message, the base station will send the DCI scrambled by P-RNTI at the PO time used for sending the paging of the UE. For the UE, regardless of whether it has its own Paging, it needs to wake up and monitor the DCI scrambled by P-RNTI. Once the DCI scrambled by P-RNTI is detected, the UE performs following related operations including PDCCH and PDSCH demodulation and decoding until the UE finds that it is not recorded in the UE list information that sends the paging message. As a result, unnecessary power consumption of the terminal is caused.

For the monitoring of the PDCCH of the paging of the terminal, it has been discussed whether it is necessary to use a signal to indicate whether the terminal needs to wake up at the PO time (in other words, it has been discussed whether it is necessary to use a signal to indicate whether the terminal needs to wake up at the PO time), that is, when there is a terminal with paging at the PO time, the terminal will be woken up to monitor the Paging DCI at the PO time; otherwise, the terminal will continue to sleep without performing DCI monitoring at the PO time. Therefore, for a terminal that does not need to be woken up to receive DCI, invalid monitoring of the Paging DCI at the PO time is avoided, thereby reducing unnecessary power consumption of the terminal. However, the specific implementation details of the wake-up signal for the Paging DCI monitoring of the terminal are not clear yet.

In the topic of terminal energy saving, the monitoring of DCI during the activation period of Discontinuous Reception (DRX) indicated by the wake-up signal in the RRC connection state is supported. Specifically, the energy saving signal is sent before the DRX activation period, and the energy saving signal is used to indicate whether the terminal is awakened in the subsequent DRX cycle. When the terminal detects a wake-up signal (WUS), the receiver is waken-up to enter the active period to monitor the PDCCH; otherwise, the terminal continues to sleep in the subsequent DRX cycle to save energy consumption. The wake-up indication can be indicated by 1 bit in the DCI of the energy-saving signal, “1” means being woken up; “0” means sleep. The WUS triggers drx-onDurationTimer to start running, so that the terminal enters the activation period and performs PDCCH monitoring. Since whether to wake up the subsequent DRX cycle is the most important function for sending the energy-saving signal outside the activation period, the energy-saving signal is also referred to as WUS-PDCCH for short. In addition, it also supports the sending of sequence-based wake-up signals. The wake-up signals are used to indicate whether the terminal needs to be woken up for Paging DCI monitoring at each PO. The initial sequence is generated by the cell ID, the sub-frame of the corresponding first PO, and the position of the slot, so that after receiving the sequence of the wake-up signal, the terminal can perform correlation matching to confirm whether to wake up to perform Paging DCI monitoring at this PO. Alternatively, the generation of the wake-up sequence is based on the UE-group-ID. However, if the above methods are directly used for Paging DCI monitoring, there may be the following problems:

The indication of DCI monitoring in the RRC connected state is PDCCH-based, and is used to indicate whether each terminal needs to be woken up to monitor PDCCH in the next DRX cycle. The DCI monitoring of Paging is based on the sequence, and the sequence is generated based on the cell ID and the sub-frame and slot number of the first PO, which is used to indicate the wake-up of all terminals at the PO time, and another wake-up sequence is generated based on the UE-group-ID, which is used to indicate the monitoring of the DCI of the Paging of a certain terminal group.

As for the monitoring of the DCI of Paging, if the DCI scrambled by the P-RNTI carries a short message, the terminal in the area or the cell needs to receive the short message; if the DCI scrambled by the P-RNTI carries paging, and only the paged terminal needs to receive the Paging DCI. Regardless of the PDCCH-based or sequence-based, it is impossible to distinguish whether all terminals at the area level or cell level or only a certain UE or some UEs need to receive the paging message of the terminal at the same time. If all terminals at the area level or cell level need to receive, then UEs that are not paged still need to be woken up to monitor and receive the DCI of Paging, thus causing waste of power. In addition, if only the paged UE is indicated, for area-level or cell-level short messages, the number of UEs that need to be indicated is relatively large, and the resource overhead of the base station is relatively large.

In addition, for the monitoring of Paging DCI, if the DCI scrambled by P-RNTI carries short messages, the DCI does not need to schedule PDSCH; if the DCI scrambled by P-RNTI carries paging of a certain UE or certain UEs, the DCI needs to follow the scheduled PDSCH. Similarly, no matter whether the PDCCH-based or the sequence-based indication mode is adopted, it cannot be distinguished whether there is scheduling data. If there is no scheduling data but only short messages, the terminal still needs to open the PDSCH cache, which causes invalid power consumption of the terminal.

To sum up, it can be seen that, first, there is no clear specific implementation solution for the indication of Paging DCI monitoring; second, for the energy saving topic, the indication scheme based on the PDCCH-based wake-up signal or sequence-based wake-up signal in the RRC connection state is directly applied to the Paging DCI indication, it cannot distinguish whether the paging message of the terminal is received by all terminals at the area level or cell level, or only a certain UE or some UEs, thus, it will either cause useless monitoring power consumption of the terminal, or cause a large resource overhead of the base station, and will also have a certain impact on the delay of the short message; third, if the indication of Paging DCI is directly applied to the terminal, it will also bring useless power consumption.

Therefore, the present disclosure provides a signal receiving method and a signal sending method to solve the problem of invalid power consumption of the terminal caused by the invalid PDCCH monitoring and useless PDSCH buffering, and the problem of a large resource overhead of the base station caused by the indication of the energy-saving signal.

FIG. 1 is a schematic flowchart of a signal receiving method provided by an embodiment of the present disclosure. The method is applied to a node and includes the following steps:

101. Obtaining, by the node, target information, wherein the target information includes first information and/or second information;

102. Obtaining, by the node, wake-up information according to the target information, wherein the wake-up information obtained according to the first information includes at least one of area-level wake-up information, cell-level wake-up information, or node group-level wake-up information, wake-up information obtained according to the second information includes at least one of node group-level wake-up information and node-level wake-up information;

103. Performing waking up or continuing to sleep of the node according to indication of the wake-up information.

It should be noted that the node may be a User Equipment (UE), such as a mobile phone, a tablet computer, a laptop computer, a personal digital assistant (PDA), Mobile Internet Device (MID) or wearable device and other terminal-side devices.

The node may also be a remote radio unit (RRU), a remote radio head (RRH), or a transmission reception point (TRP), and the like. The specific type of nodes is not limited in the embodiments of the present disclosure.

In addition, the node may be a node in an idle state or an inactive state.

It should also be noted that the wake-up information is used to indicate the wake-up of the node, for example, to indicate that the node wakes up at a paging occasion (PO) to receive a paging message. The wake-up information includes at least one of the following categories: area-level wake-up information, cell-level wake-up information, node group-level wake-up information, and node-level wake-up information.

Wherein, the area-level wake-up information is used to indicate at least one cell-level wake-up information in the area. When there is area-level information to be sent and all nodes in the area need to receive the same, the area-level wake-up information can be used. All nodes in the area need to receive the wake-up information and wake up or sleep according to the wake-up information. If the node is woken up, the node will receive subsequent area-level information.

The cell-level wake-up information is used to indicate the wake-up information of at least one node or node group in the cell. When there is cell-level information to be sent and all nodes in the cell need to receive the same, the cell-level information can be used. All nodes in the cell need to receive the wake-up information and wake up or sleep according to the wake-up information. If the node is woken up, the node will receive subsequent cell-level information.

The node group-level wake-up information includes the wake-up information of at least one node. When there is node group-level information to be sent and all nodes in the node group need to receive the same, the node group-level wake-up signal can be used. All nodes in the node group need to receive the wake-up information, and wake up or sleep according to the wake-up information, and if the node is awakened, then the node will receive subsequent node group-level information;

The node-level wake-up information is used to indicate the wake-up information of one node. When there is node-level information to be sent and the node needs to receive the same, the node-level wake-up information can be used. The node needs to receive the wake-up information, and wake up or sleep according to the wake-up information, and if the node is woken up, the node will receive subsequent node-level information.

The area-level information refers to information that all nodes in the area need to receive;

The cell-level information refers to information that all nodes in the cell need to receive;

The node group-level information refers to the information that all nodes in the node group need to receive;

The node-level information refers to information that the node needs to receive.

In the embodiment of the present disclosure, the first information and/or the second information may be used to indicate different levels of wake-up information, so that the node (including the terminal) side can accurately know the level of the message to be received. If it is an area-level or cell-level message, all nodes in the area or cell need to be woken up. However, if it is a node-level or node group-level message, only the indicated node needs to be woken up, and other nodes do not need to be woken up, so that the unnecessary power consumption of the node caused by unnecessary wakeup can be reduced.

The embodiments of the present disclosure may be applicable to the wake-up indication of the monitoring of the Paging DCI in the RRC-Idle/Inactive state of the terminal.

The signal receiving method is illustrated below as an example.

Optionally, after obtaining the wake-up information according to the target information, the method further includes:

Determining whether to receive physical downlink shared channel (PDSCH) according to the indication of the wake-up information.

Specifically, if it is determined not to receive the PDSCH according to the wake-up information, then the node only needs to receive the Physical Downlink Control Channel (PDCCH) after waking up, and does not need to open the PDSCH buffer, thereby further reducing the power consumption of the node.

If it is determined to receive PDSCH according to the wake-up information, then the node needs to receive the PDCCH first after waking up, and then obtain downlink control information (DCI) from the received PDCCH, if the node is in the idle state, then the DCI is the DCI scrambled by the Paging-Radio Network Temporary Identity (P-RNTI), and finally the PDSCH buffer is opened, and the PDSCH is received according to the scheduling information in the DCI.

Optionally, the determining whether to receive the PDSCH according to the indication of the wake-up information includes:

If the wake-up information obtained according to the target information includes at least one of the node group-level wake-up information and the node-level wake-up information, it is necessary to receive the PDSCH scheduled by the DCI scrambled by the P-RNTI; otherwise, it is not necessary to receive the PDSCH scheduled by the DCI scrambled by the P-RNTI.

Specifically, if the wake-up information obtained according to the target information includes area-level wake-up information and/or cell-level wake-up information, does not include node group-level wake-up information, and does not include node-level wake-up information, then it may be determined that the node does not need to receive the PDSCH scheduled by DCI scrambled by the P-RNTI. On the contrary, if the wake-up information obtained according to the target information includes node group-level wake-up information and/or node-level wake-up information, it can be determined that the node needs to receive the PDSCH scheduled by DCI scrambled by the P-RNTI. This is because the area-level information and cell-level information are information of the PDSCH scheduled by DCI not scrambled by the P-RNTI, while node-group-level information and node-level information are information of the PDSCH scheduled by DCI scrambled by the P-RNTI.

That is to say, the node can obtain the level of the information to be received according to the level of the wake-up information indicated by the first information and/or the second information, so as determine whether to receive the PDSCH scheduled by DCI scrambled by the P-RNTI.

Of course, after the node is woken up, the node receives the PDCCH and the PDSCH as needed, the node can also receive other signals such as a reference signal.

Optionally, the first information includes at least one of time domain resource information, frequency domain resource information, spatial domain resource information, sequence information, bit information, and monitoring parameter configuration information;

The second information includes at least one of time domain resource information, frequency domain resource information, spatial domain resource information, sequence information, bit information, and monitoring parameter configuration information.

That is to say, the first information can be of a plurality of types, such as at least one of time domain resource information, frequency domain resource information, spatial domain resource information, sequence information, bit information, and monitoring parameter configuration information; the second information may also be of a plurality of types, such as at least one of time domain resource information, frequency domain resource information, spatial domain resource information, sequence information, bit information, and monitoring parameter configuration information.

Specifically, when the first information includes at least one of time domain resource information, frequency domain resource information, and spatial domain resource information, the step of obtaining wake-up information according to the target information is specifically to receive the wake-up signal based on the target information, and then decode to obtain the wake-up information. When the first information includes at least one of sequence information, bit information, and monitoring parameter configuration information, the step of obtaining wake-up information according to the target information specifically includes interpreting the wake-up information according to the target information.

The time domain resource information configured as the first information is first time domain resource information, and the time domain resource information configured as the second information is second time domain resource information, and at least one of the first time domain resource and the second time domain resource is used to indicate wake-up information; the frequency domain resource information configured as the first information is first frequency domain resource information, and the frequency domain resource information configured as the second information is second frequency domain resource information, and at least one of the first frequency domain resource and the second frequency domain resource is used to indicate wake-up information; the spatial domain resource information configured as the first information is first spatial domain resource information, and the spatial domain resource information configured as the second information is second spatial domain resource information, and at least one of the first spatial domain resource and the second spatial domain resource is used to indicate wake-up information; the bit information configured as the first information is first bit information, and the bit information configured as the second information is second bit information, and at least one of the first bit information and the second bit information is used to indicate wake-up information; the sequence information configured as the first information is first sequence information, and the sequence information configured as the second information is second sequence information, and at least one of the first sequence information and the second sequence information is used to indicate wake-up information; the monitoring parameter configuration information configured as the first information is first monitoring parameter configuration information, and the monitoring parameter configuration information configured as the second information is second monitoring parameter configuration information, and at least one of the first monitoring parameter configuration information and the second monitoring parameter configuration information is used to indicate wake-up information.

Wherein, the time domain resources include at least one of a sub-frame, a slot and a symbol. When the time domain resource includes a sub-frame, it may include one sub-frame, or may include a plurality of sub-frames. When the time domain resource includes a slot, it may include one slot, or may include a plurality of slots. When the time domain resource includes a symbol, it may include one symbol, or may include a plurality of symbols.

The frequency domain resource includes at least one of a carrier, a BandWidth Partial, (BWP), a resource block group (RBG), a resource block (RB), a resource element group (REG) or a Resource Element (RE). When the frequency domain resource includes a carrier, it may include one carrier, or may include a plurality of carriers. When the frequency domain resource includes a BWP, it may include one BWP, or may include a plurality of BWPs. When the frequency domain resource includes an RBG, it may include one RBG, or may include a plurality of RBGs. When the frequency domain resource includes RBs, it may include one RB, or may include a plurality of RBs. When the frequency domain resource includes a REG, it may include one REG, or may include a plurality of REGs. When the frequency domain resources include REs, it may include one RE, or may include a plurality of REs.

The spatial domain resource includes at least one of a transceiver point (TRP), an antenna port, an antenna, or a beam. When the spatial domain resource includes a TRP, it may include one TRP, or may include a plurality of TRPs. When the spatial domain resource includes an antenna port, it may include one antenna port, or may include a plurality of antenna ports. When the spatial domain resource includes an antenna, it may include one antenna, or may include a plurality of antennas. When the spatial domain resource includes a beam, it may include one beam, or may include a plurality of beams.

The sequences indicated by the sequence information may be of the same sequence type or of different sequence types. The sequences may be the same root sequence of the same sequence type, or different root sequences of the same sequence type. The sequence may be an initial configuration generated with different parameter configurations and/or parameter types. For example, the sequence type may be a gold sequence, a ZC sequence, a pseudo-random (PN) sequence, or a Harmad sequence. The sequence may be an initial configuration generated with different parameter configurations and/or parameter types, and may be an initial sequence of initial configurations generated with different IDs, for example, it may be a cell ID, an area ID, a UE ID, or an ID configured by a high layer.

When the sequence information is configured as the first information, it is the first sequence information, and when it is configured as the second information, it is the second sequence information, and the sequence indicated by the first sequence information and the sequence indicated by the second sequence information may be the same sequence type, or a different sequence type. The sequences may be the same root sequence of the same sequence type, or different root sequences of the same sequence type. The sequence may be an initial configuration generated with different parameter configurations and/or parameter types.

The monitoring parameter configuration includes at least one of at least one wake-up information parameter configuration, and the monitoring parameters include a Core resource set (CORESET) resource, a search space resource, a PDCCH candidate resource, a symbol of a CORESET resource, and a resource block of a CORESET resource. When the monitoring parameter includes a CORESET resource, it may include one CORESET resource, or may include a plurality of CORESET resources. When the monitoring parameter includes a search space resource, it may include one search space resource, or may include a plurality of search space resources. When the monitoring parameter includes a PDCCH candidate resource, it may include one PDCCH candidate resource, or may include a plurality of PDCCH candidate resources. When the monitoring parameter includes a symbol of the CORESET resource, it may include one symbol of the CORESET resource, or may include a plurality of symbols of the CORESET resource. When the monitoring parameter includes a resource block of the CORESET resource, it may include one resource block of the CORESET resource, or may include a plurality of resource blocks of the CORESET resource.

Wherein, the search space resource includes at least one of a sub-frame, a slot, a symbol, search space period configuration, search space duration, a pattern of a search space time domain symbol, a starting position of search space, a monitoring position and a search space type. When the search space resource includes a sub-frame, it may include one sub-frame, or may include a plurality of sub-frames. When the search space resource includes a slot, it may include one slot, or may include a plurality of slots. When the search space resource includes a symbol, it may include one symbol or a plurality of symbols. When the search space resource includes search space period configuration, it may include one search space period configuration, or may include a plurality of search space period configuration. When the search space resource includes search space duration, it may include one search space duration or a plurality of search space duration. When the search space resource includes a pattern of a search space time domain symbol, it may include one pattern of search space time domain symbol, or may include a plurality of patterns of search space time domain symbol. When the search space resource includes a start position of the search space, it may include one start position of the search space, or may include a plurality of start positions of the search space. When the search space resource includes a monitoring position, it may include one monitoring position or a plurality of monitoring positions. When the search space resource includes a search space type, it may include one search space type, or may include a plurality of search space types.

Optionally, the area-level wake-up information is used to indicate at least one of the following:

Whether area-level information exists;

Whether to wake up all nodes in a target area to receive the area-level information;

Waking up all nodes in the target area to receive the area-level information;

a type of information to be received including the area-level information;

a type of short message;

a type of a system message to be updated;

Whether to update the system message.

Wherein, the type of short message includes at least one of system message update, an alert message or a first message;

Wherein, the first message is used to instruct the node to stop monitoring PO.

Types of the system message include system information block (SIB) 1, SIB2, SIB3, SIB4, SIB5, SIB6, SIB7, and the like.

Optionally, the cell-level wake-up information is used to indicate at least one of the following:

Whether cell-level information exists;

Whether to wake up all nodes in a target area to receive the cell-level information;

Waking up all nodes in the target area to receive the cell-level information;

a type of information to be received including the cell-level information;

a type of short message;

a type of a system message to be updated;

Whether to update the system message.

Optionally, the node group-level wake-up information is used to indicate at least one of the following:

Whether node group-level information exists;

Whether to wake up all nodes in a target node group to receive the node group-level information;

Waking up all nodes in the target node group to receive node group-level information;

a type of information to be received including the node group-level information;

a serial number of a node group to be woken up;

Whether to wake up at least one node group.

Optionally, the node-level wake-up information is used to indicate at least one of the following:

Whether node-level information exists;

Whether to wake up a target node to receive the node-level information;

Waking up the target node to receive the node-level information;

a type of information to be received including the node-level information;

a serial number of a node to be woken up;

Whether to wake up at least one node.

That is to say, the wake-up information carried in the first information indicates at least one of the following:

Whether area-level information exists;

Whether to wake up all nodes in a target area to receive the area-level information;

Waking up all nodes in the target area to receive the area-level information;

Whether cell-level information exists;

Whether to wake up all nodes in the target area to receive the cell-level information;

Waking up all nodes in the target area to receive the cell-level information;

Whether node group-level information exists;

Whether to wake up all nodes in the node group to receive the node group-level information;

Waking up all nodes in the node group to receive the node group-level information;

The type of information to be received including the area-level information;

The type of information to be received including the cell-level information;

The type of information to be received including the node group-level information;

The type of the short message;

The type of the system message to be updated;

Whether to update the system message.

The wake-up information carried in the second information indicates at least one of the following:

Whether node group-level information exists;

Whether to wake up all nodes in the node group to receive the node group-level information;

Waking up all nodes in the node group to receive the node group-level information;

Whether the node-level information exists;

Whether to wake up the target node to receive the node-level information;

Waking up the target node to receive the node-level information;

The type of information to be received including the node group-level information;

The type of information to be received including the node-level information;

the serial number of the node group to be woken up;

The serial number of the node to be woken up;

Whether to wake up at least one node group;

Whether to wake up at least one node.

Optionally, the area-level information includes at least one of a broadcast message, a short message, and other information of PDSCH scheduled by DCI not scrambled by P-RNTI.

Optionally, the cell-level information includes at least one of a broadcast message, a short message, and other information of PDSCH scheduled by DCI not scrambled by P-RNTI.

Optionally, the node group-level information includes at least one of a broadcast message, a short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message;

Wherein, the first message is used to instruct the node to stop monitoring PO.

Specifically, the system message includes at least one of all types of system messages. The alert message includes at least one of Earthquake and Tsunami Warning System (ETWS) and Commercial Mobile Alert Service (CMAS).

The wake-up information carried (or indicated) by various first information and/or second information is illustrated below with examples.

When the bit information is configured as the first information, it is the first bit information, and when it is configured as the second information, it is the second bit information, and at least one of the first bit information and the second bit information is used to indicate a wake-up message.

The wake-up information carried in the first bit information indicates at least one of the following:

Whether area-level information exists;

Whether to wake up all nodes in a target area to receive the area-level information;

Waking up all nodes in the target area to receive the area-level information;

Whether cell-level information exists;

Whether to wake up all nodes in the target area to receive the cell-level information;

Waking up all nodes in the target area to receive the cell-level information;

Whether node group-level information exists;

Whether to wake up all nodes in the node group to receive the node group-level information;

Waking up all nodes in the node group to receive the node group-level information;

The type of information to be received including the area-level information;

The type of information to be received including the cell-level information;

The type of information to be received including the node group-level information;

The type of the short message;

The type of the system message to be updated;

Whether to update the system message.

The wake-up information carried in the second bit information indicates at least one of the following:

Whether node group-level information exists;

Whether to wake up all nodes in the node group to receive the node group-level information;

Waking up all nodes in the node group to receive the node group-level information;

Whether the node-level information exists;

Whether to wake up the target node to receive the node-level information;

Waking up the target node to receive the node-level information;

The type of information to be received including the node group-level information;

The types of information to be received including the node-level information;

The serial number of the node group to be woken up;

The serial number of the node to be woken up;

Whether to wake up at least one node group;

Whether to wake up at least one node.

Specifically, the first bit information includes at least N bits, wherein N is an integer not less than zero.

When N=0, that is, when the first bit information includes zero bits, it means at least one of the following: the first bit information does not exist; the wake-up information indicated by the first bit information does not exist; the area-level wake-up information indicated by the first bit information does not exist; the cell-level wake-up information indicated by the first bit information does not exist; the node group-level information indicated by the first bit information does not exist; the node does not need to be woken up to receive the area-level information; the node does not need to be woken up to receive the cell-level information; the node does not need to be woken up to receive the node group-level information;

When N=1, that is, the first bit information includes one bit, and the value of the one bit is 0, it means at least one of the following: the wake-up information indicated by the first bit information does not include the area-level wake-up information; the wake-up information indicated by the first bit information does not include the cell-level wake-up information; the wake-up information indicated by the first bit information does not include the node group-level wake-up information; the node does not need to be woken up to receive the area-level information; the node does not need to be woken up to receive the cell-level information; the node does not need to be woken up to receive the node group-level information;

When N=1, that is, the first bit information includes one bit, and the value of the one bit is 1, it means at least one of the following: the wake-up information indicated by the first bit information includes the area-level wake-up information; the wake-up information indicated by the first bit information includes the cell-level wake-up information; the wake-up information indicated by the first bit information includes the node group-level wake-up information; the node needs to be woken up to receive the area-level information; the node needs to be woken up to receive the cell-level information; the node needs to be woken up to receive the node group-level information;

When N>1, that is, when the first bit information includes more than one bits, it means at least one of the following:

The wake-up information indicated by the first bit information includes the area-level wake-up information;

The wake-up information indicated by the first bit information includes the cell-level wake-up information;

The wake-up information indicated by the first bit information includes the node group-level wake-up information;

The wake-up information indicated by the first bit information includes wake-up information indicating the type of short message;

The wake-up information indicated by the first bit information includes wake-up information indicating the type of the system message to be updated;

The wake-up information indicated by the first bit information includes wake-up information indicating whether to update the system message.

Wherein, "0" indicates that the system information of the corresponding bit does not need to be updated, and "1" indicates that the system information of the corresponding bit needs to be updated.

Specifically, the second bit information includes at least M bits, wherein M is an integer not less than zero.

When M=0, that is, the second bit information includes zero bits, it means at least one of the following: the second bit information does not exist; the wake-up information indicated by the second bit information does not exist; the node group-level wake-up information indicated by the second bit information does not exist; the node-level wake-up information indicated by the second bit information does not exist; the node does not need to be woken up to receive the node group-level information; the node does not need to be woken up to receive the node-level information;

When M=1, that is, the second bit information includes one bit, and the value of the one bit is 0, it means at least one of the following: the wake-up information indicated by the second bit information does not include the node group-level wake-up information; the wake-up information indicated by the second bit information does not include the node-level wake-up information; the node does not need to be woken up to receive the node group-level information; the node does not need to be woken up to receive the node-level information;

When M=1, that is, the second bit information includes one bit, and the value of the one bit is 1, it means at least one of the following: the wake-up information indicated by the second bit information includes the node group-level wake-up information; the wake-up information indicated by the second bit information includes the node-level wake-up information; the node needs to be woken up to receive the node-level information; the node needs to be woken up to receive the node-level information;

When M>1, that is, when the second bit information includes more than one bit, it means at least one of the following:

The wake-up information indicated by the second bit information includes the node group-level wake-up information;

The wake-up information indicated by the second bit information includes the node-level wake-up information;

The wake-up information indicated by the second bit information includes wake-up information indicating the serial number of the node group to be woken up;

The wake-up information indicated by the second bit information includes wake-up information indicating the serial number of the node to be woken up;

The wake-up information indicated by the second bit information includes wake-up information indicating whether to wake up at least one node group;

The wakeup information indicated by the second bit information includes wakeup information indicating whether to wake up at least one node.

Wherein, “0” indicates that the corresponding node group or node does not need to be woken up, and “1” indicates that the corresponding node group or node needs to be woken up.

Figure 2:
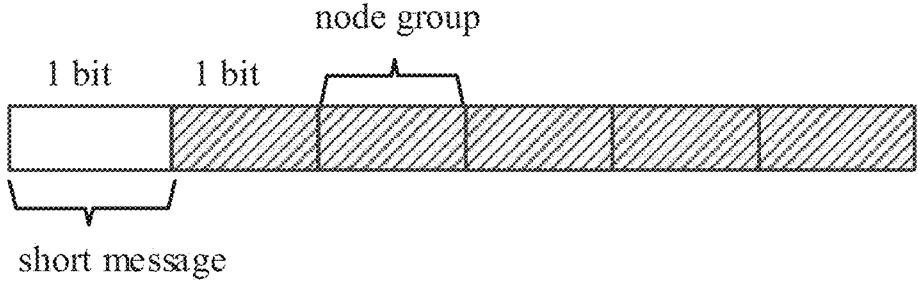
FIG. 2 is a schematic diagram of a wake-up indication when the first information is the first bit information and the second information is the second bit information in an embodiment of the present disclosure.

FIG. 2 is a schematic diagram of the wake-up indication when the first information is the first bit information and the second information is the second bit information, where the first bit from the left indicates whether there is a short message in the target cell/target area. If the value of this bit is “0”, it means that there is no short message in the target cell/target area, and there is no need to wake up to receive a short message; if the value of this bit is “1”, it means that there is a short message in the target cell/target area, it needs to wake up to receive the short message. The third bit from the left indicates whether there is a paging message in the target node group (specifically which node group is configured by the network side device), if the value of this bit is “0”, it means that there is no paging message in the target node group. If the value of this bit is “1”, it means that there is a paging message in the target node group, and it needs to be woken up to receive the paging message.

FIG. 3 is another schematic diagram of a wake-up indication when the first information is the first bit information and the second information is the second bit information, where every two bits correspond to a node group. In every two bits, the first bit indicates whether there is a short message in the area/cell to which the corresponding node group belongs, whether the node needs to be woken up to receive the short message, and the second bit indicates whether there is a paging message in the corresponding node group, and whether nodes in the node group need to be woken up to receive the paging message.

When the sequence information is configured as the first information, it is the first sequence information, and when it is configured as the second information, it is the second sequence information, and at least one of the first sequence information and the second sequence information is used to indicate wake-up information.

The content indicated by the wake-up information carried in the first sequence information is the same as the first bit information, and will not be repeated here. The content indicated by the wake-up information carried in the second sequence information is the same as the second bit information, and will not be described again here.

Specifically, the first sequence information includes at least X sequences, where X is an integer not less than zero.

When X=0, that is, the first sequence information includes zero sequences, it means at least one of the following: the first sequence information does not exist; the wake-up information indicated by the first sequence information does not exist; the area-level wake-up information indicated by the first sequence information does not exist; the cell-level wake-up information indicated by the first sequence information does not exist; the node group-level wake-up information indicated by the first sequence information does not exist; the node does not need to be woken up to receive area-level information; the node does not need to be woken up to receive the cell-level information; the node does not need to be woken up to receive the node group-level information;

When X=1, that is, the first sequence information includes one sequence, it means at least one of the following: the wake-up information indicated by the first sequence information includes the area-level wake-up information; the wake-up information indicated by the first sequence information includes the cell-level wake-up information; the wake-up information indicated by the first sequence information includes the node group-level wake-up information; the node needs to be woken up to receive the area-level information; the node needs to be woken up to receive the cell-level information; the node needs to be woken up to receive the node group-level information;

When X>1, that is, when the first sequence information includes more than one sequence, it means at least one of the following:

The wake-up information indicated by the first sequence information including the area-level wake-up information;

The wake-up information indicated by the first sequence information including the cell-level wake-up information;

The wake-up information indicated by the first sequence information including the node group-level wake-up information;

The wake-up information indicated by the first sequence information including wake-up information indicating a type of short message;

The wake-up information indicated by the first sequence information including wake-up information indicating a type of system message that needs to be updated;

The wake-up information indicated by the first sequence information including wake-up information indicating whether the system message needs to be updated.

Specifically, the second sequence information includes at least Y sequences, where Y is an integer not less than zero.

When Y=0, that is, the second sequence information includes zero sequences, it means at least one of the following: the second sequence information does not exist; the wake-up information indicated by the second sequence information does not exist; the node group-level wake-up information indicated by the second sequence information does not exist; the node-level wake-up information indicated by the second sequence information does not exist; the node does not need to be woken up to receive the node group-level information; the node does not need to be woken up to receive the node-level information;

When Y=1, that is, the second sequence information includes one sequence, it means at least one of the following: the wake-up information indicated by the second sequence information includes the node group-level wake-up information; the wake-up information indicated by the second sequence information includes the node-level wake-up information; the node needs to be woken up to receive the node-level information; the node needs to be woken up to receive the node-level information;

When Y>1, that is, when the second sequence information includes more than one sequence, it means at least one of the following:

The wake-up information indicated by the second sequence including the node group-level wake-up information;

The wake-up information indicated by the second sequence including the node-level wake-up information;

The wake-up information indicated by the second sequence information including the wake-up information indicating a serial number of a node group that needs to be woken up;

The wake-up information indicated by the second sequence information including wake-up information indicating a serial number of a node that needs to be woken up;

The wake-up information indicated by the second sequence including wake-up information indicating whether at least one node group needs to be woken up;

The wake-up information indicated by the second sequence including wake-up information indicating whether at least one node needs to wake up.

FIG. 4 is a schematic diagram of a wake-up indication when the first information is the first sequence information and the second information is the second sequence information. Among them, the first sequence indicates that the node needs to be woken up to receive the area-level information; the second sequence indicates that the node group 1 needs to be woken up to receive the node group-level information; the third sequence indicates that the node group 2 needs to be woken up to receive the node group-level information; the fourth sequence indicates that node group 3 needs to be woken up to receive the node group-level information; the fifth sequence indicates that node group 4 needs to be woken up to receive the node group-level information; the sixth sequence indicates that node group 5 needs to be woken up to receive the node group-level information; the seventh sequence indicates that node group 6 needs to be woken up to receive the node group-level information.

When the time domain resource information is configured as the first information, it is the first time domain resource information, when it is configured as the second information, it is the second time domain resource information, and at least one of the first time domain resource information and the second time domain resource information is used to indicate the wake-up information.

The content indicated by the wake-up information carried by the first time domain resource information is the same as the first bit information, which will not be repeated here, and the content indicated by the wake-up information carried by the second time domain resource information is the same as the second bit information, which will not be repeated here.

Specifically, the first time domain resource includes K time domain units, where K is an integer not less than zero. The time domain unit may be at least one of a symbol, a slot and a sub-frame.

When K=0, that is, the first time domain resource includes zero time domain units, it means at least one of the following: the first time domain resource does not exist; the wake-up information carried by the first time domain resource does not exist; the area-level wake-up information carried by the first time domain resource does not exist; the cell-level wake-up information carried by the first time domain resource does not exist; the node group-level wake-up information carried by the first time domain resource does not exist; the node does not need to be woken up to receive the area-level information; the node does not need to be woken up to receive the cell-level information; the node does not need to be woken up to receive the node group-level information;

When K>0, that is, when the first time domain resource includes one or more time domain units, it means at least one of the following:

The node needs to be woken up to receive the area-level information;

The node needs to be woken up to receive the cell-level information;

The node needs to be woken up to receive the node group-level information;

The wake-up information carried by the first time domain resource includes the area-level wake-up information;

The wake-up information carried by the first time domain resource includes the cell-level wake-up information;

The wake-up information carried by the first time domain resource includes the node group-level wake-up information;

The wake-up information carried by the first time domain resource includes wake-up information indicating the type of the short message;

The wake-up information carried by the first time domain resource includes wake-up information indicating the type of system message that needs to be updated;

The wake-up information carried by the first time domain resource includes wake-up information indicating whether the system message needs to be updated.

Specifically, the second time domain resource includes L time domain units, where L is an integer not less than zero. The time domain unit may be at least one of a symbol, a slot and a sub-frame.

When L=0, that is, the second time domain resource includes zero time domain units, it means at least one of the following: the second time domain resource does not exist; the wake-up information carried by the second time domain resource does not exist; the node group-level wake-up information carried by the second time domain resource does not exist; the node-level wake-up information carried by the second time domain resource does not exist; the node does not need to be woken up to receive the node group-level information; the node does not need to be woken up to receive the node-level information;

When L>0, that is, when the second time domain resource includes one or more time domain units, it means at least one of the following:

The node needs to be woken up to receive the node group-level information;

The node needs to be woken up to receive the node-level information;

The wake-up information carried by the second time domain resource includes the node group-level wake-up information;

The wake-up information carried by the second time domain resource includes the node-level wake-up information;

The wake-up information carried by the second time domain resource includes wake-up information indicating the serial number of the node group that needs to be woken up;

The wake-up information carried by the second time domain resource includes wake-up information indicating the serial number of the node that needs to be woken up;

The wake-up information carried by the second time domain resource includes wake-up information indicating whether at least one node group needs to be woken up;

The wakeup information carried by the second time domain resource includes wakeup information indicating whether at least one node needs to be woken up.

FIG. 5 is a schematic diagram of a wake-up indication when the first information is the first time domain resource information and the second information is the second time domain resource information.

When the frequency domain resource information is configured as the first information, it is the first frequency domain resource information, when it is configured as the second information, it is the second frequency domain resource information, and at least one of the first frequency domain resource information and the second frequency domain resource information is used to indicate the wake-up information.

The content indicated by the wake-up information carried by the first frequency domain resource information is the same as the first bit information, which will not be repeated here, and the content indicated by the wake-up information carried by the second frequency domain resource information is the same as the second bit information, which will not be repeated here.

Specifically, the first frequency domain resource includes S frequency domain units, where S is an integer not less than zero. The frequency domain unit may be at least one of RE, RB, REG, RBG, BWP and a carrier.

When S=0, that is, the first frequency domain resource includes zero frequency domain units, it means at least one of the following: the first frequency domain resource does not exist; the wake-up information carried by the first frequency domain resource does not exist; the area-level wake-up information carried by the first frequency domain resource does not exist; the cell-level wake-up information carried by the first frequency domain resource does not exist; the node group-level wake-up information carried by the first frequency domain resource does not exist; the node does not need to be woken up to receive the area-level information; the node does not need to be woken up to receive the cell-level information; the node does not need to be woken up to receive the node group-level information;

When S>0, that is, when the first frequency domain resource includes one or more frequency domain units, it means at least one of the following:

The node needs to be woken up to receive the area-level information;

The node needs to be woken up to receive the cell-level information;

The node needs to be woken up to receive the node group-level information;

The wake-up information carried by the first frequency domain resource includes the area-level wake-up information;

The wake-up information carried by the first frequency domain resource includes the cell-level wake-up information;

The wake-up information carried by the first frequency domain resource includes the node group-level wake-up information;

The wake-up information carried by the first frequency domain resource includes wake-up information indicating the type of the short message;

The wake-up information carried by the first frequency domain resource includes wake-up information indicating the type of system message that needs to be updated;

The wake-up information carried by the first frequency domain resource includes wake-up information indicating whether the system message needs to be updated.

Specifically, the second frequency domain resource includes T frequency domain units, where T is an integer not less than zero. The frequency domain unit may be at least one of RE, RB, REG, RBG, BWP and a carrier.

When T=0, that is, the second frequency domain resource includes zero frequency domain units, it means at least one of the following: the second frequency domain resource does not exist; the wake-up information carried by the second frequency domain resource does not exist; the node group-level wake-up information carried by the second frequency domain resource does not exist; the node-level wake-up information carried by the second frequency domain resource does not exist; the node does not need to be woken up to receive the node group-level information; the node does not need to be woken up to receive the node-level information;

When T>0, that is, when the second frequency domain resource includes one or more frequency domain units, it means at least one of the following:

The node needs to be woken up to receive the node group-level information;

The node needs to be woken up to receive the node-level information;

The wake-up information carried by the second frequency domain resource includes the node group-level wake-up information;

The wake-up information carried by the second frequency domain resource includes the node-level wake-up information;

The wake-up information carried by the second frequency domain resource includes wake-up information indicating the serial number of the node group that needs to be woken up;

The wake-up information carried by the second frequency domain resource includes wake-up information indicating the serial number of the node that needs to be woken up;

The wake-up information carried by the second frequency domain resource includes wake-up information indicating whether at least one node group needs to be woken up;

The wakeup information carried by the second frequency domain resource includes wakeup information indicating whether at least one node needs to be woken up.

Figure 6:
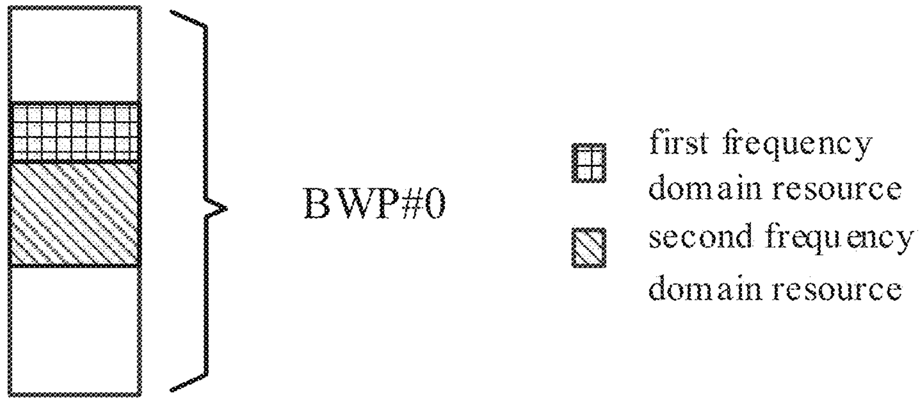
FIG. 6 is a schematic diagram of a wake-up indication when the first information is the first frequency domain resource information and the second information is the second frequency domain resource information in an embodiment of the present disclosure.

FIG. 6 is a schematic diagram of a wake-up indication when the first information is the first frequency domain resource information and the second information is the second frequency domain resource information.

When the spatial domain resource information is configured as the first information, it is the first spatial domain resource information, when it is configured as the second information, it is the second spatial domain resource information, and at least one of the first spatial domain resource information and the second spatial domain resource information is used to indicate the wake-up information.

The content indicated by the wake-up information carried by the first spatial domain resource information is the same as the first bit information, which will not be repeated here, and the content indicated by the wake-up information carried by the second spatial domain resource information is the same as the second bit information, which will not be repeated here.

Specifically, the first spatial domain resource includes P spatial domain units, where P is an integer not less than zero. The spatial domain unit may be at least one of TRP, an antenna port, a number of antenna, and a beam.

When P=0, that is, the first spatial domain resource includes zero spatial domain units, it means at least one of the following: the first spatial domain resource does not exist; the wake-up information carried by the first spatial domain resource does not exist; the area-level wake-up information carried by the first spatial domain resource does not exist; the cell-level wake-up information carried by the first spatial domain resource does not exist; the node group-level wake-up information carried by the first spatial domain resource; the node does not need to be woken up to receive the area-level information; the node does not need to be woken up to receive the cell-level information; the node does not need to be woken up to receive the node group-level information;

When P>0, that is, when the first spatial domain resource includes one or more spatial domain units, it means at least one of the following:

The node needs to be woken up to receive the area-level information;

The node needs to be woken up to receive the cell-level information;

The node needs to be woken up to receive the node group-level information;

The wake-up information carried by the first spatial domain resource includes the area-level wake-up information;

The wake-up information carried by the first spatial domain resource includes the cell-level wake-up information;

The wake-up information carried by the first spatial domain resource includes the node group-level wake-up information;

The wake-up information carried by the first spatial domain resource includes wake-up information indicating the type of the short message;

The wake-up information carried by the first spatial domain resource includes wake-up information indicating the type of system message that needs to be updated;

The wake-up information carried by the first spatial domain resource includes wake-up information indicating whether the system message needs to be updated.

Specifically, the second spatial domain resource includes Q spatial domain units, where Q is an integer not less than zero. The spatial domain unit may be at least one of TRP, an antenna port, a number of antenna, and a beam.

When Q=0, that is, the second spatial domain resource includes zero spatial domain units, it means at least one of the following: the second spatial domain resource does not exist; the wake-up information carried by the second spatial domain resource does not exist; the node group-level wake-up information carried by the second spatial domain resource does not exist; the node-level wake-up information carried by the second spatial domain resource does not exist; the node does not need to be woken up to receive the node group-level information; the node does not need to be woken up to receive the node-level information;

When Q>0, that is, when the second spatial domain resource includes one or more spatial domain units, it means at least one of the following:

The node needs to be woken up to receive the node group-level information;

The node needs to be woken up to receive the node-level information;

The wake-up information carried by the second spatial domain resource includes the node group-level wake-up information;

The wake-up information carried by the second spatial domain resource includes the node-level wake-up information;

The wake-up information carried by the second spatial domain resource includes wake-up information indicating the serial number of the node group that needs to be woken up;

The wake-up information carried by the second spatial domain resource includes wake-up information indicating the serial number of the node that needs to be woken up;

The wake-up information carried by the second spatial domain resource includes wake-up information indicating whether at least one node group needs to be woken up;

The wakeup information carried by the second spatial domain resource includes wakeup information indicating whether at least one node needs to be woken up.

Figure 7:
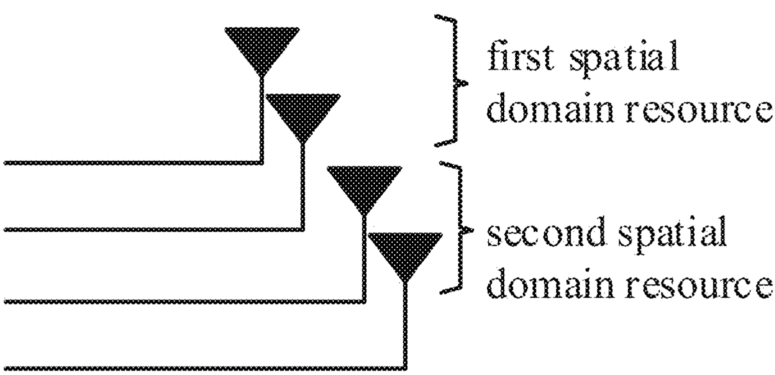
FIG. 7 is a schematic diagram of a wake-up indication when the first information is the first spatial domain resource information and the second information is the second spatial domain resource information in an embodiment of the present disclosure.

FIG. 7 is a schematic diagram of a wake-up indication when the first information is the first spatial domain resource information and the second information is the second spatial domain resource information.

When the monitoring parameter configuration information is configured as the first information, it is the first monitoring parameter configuration information, when it is configured as the second information, it is the second monitoring parameter configuration information, and at least one of the first monitoring parameter configuration information and the second monitoring parameter configuration information is used to indicate the wake-up information.

The content indicated by the wake-up information carried by the first monitoring parameter configuration information is the same as the first bit information, and will not be repeated here, and the content indicated by the wake-up information carried by the second monitoring parameter configuration information is the same as the second bit information, and will not be repeated here.

Specifically, the first monitoring parameter configuration includes C monitoring parameter configurations, where C is an integer not less than zero.

When C=0, that is, the first monitoring parameter configuration includes zero monitoring parameter configurations, it means at least one of the following: the first monitoring parameter configuration does not exist; the wake-up information carried by the first monitoring parameter configuration does not exist; the area-level wake-up information carried by the first monitoring parameter configuration does not exist; the cell-level wake-up information carried by the first monitoring parameter configuration does not exist; the node group-level wake-up information carried by the first monitoring parameter configuration does not exist; the node does not need to be woken up to receive the area-level information; the node does not need to be woken up to receive the cell-level information; the node does not need to be woken up to receive the node group-level information;

When C>0, that is, when the first monitoring parameter configuration includes one or more monitoring parameter configurations, it means at least one of the following:

The node needs to be woken up to receive the area-level information;

The node needs to be woken up to receive the cell-level information;

The node needs to be woken up to receive the node group-level information;

The wake-up information carried in the first monitoring parameter configuration includes the area-level wake-up information;

The wake-up information carried in the first monitoring parameter configuration includes the cell-level wake-up information;

The wake-up information carried in the first monitoring parameter configuration includes the node group-level wake-up information;

The wake-up information carried by the first monitoring parameter configuration includes wake-up information indicating the type of short message;

The wake-up information carried in the first monitoring parameter configuration includes wake-up information indicating the type of system message that needs to be updated;

The wake-up information carried in the first monitoring parameter configuration includes wake-up information indicating whether the system message need to be updated.

Specifically, the second monitoring parameter configuration includes D monitoring parameter configurations, where D is an integer not less than zero.

When D=0, that is, the second monitoring parameter configuration includes zero monitoring parameter configurations, it means at least one of the following: the second monitoring parameter configuration does not exist; the wake-up information carried by the second monitoring parameter configuration does not exist; the node group-level wake-up information carried by the second monitoring parameter configuration does not exist; the node-level wake-up information carried by the second monitoring parameter configuration does not exist; the node does not need to be woken up to receive the node group-level information; the node does not need to be woken up to receive the node group-level information;

When D>0, that is, when the second monitoring parameter configuration includes one or more monitoring parameter configurations, it means at least one of the following:

The node needs to be woken up to receive the node group-level information;

The node needs to be woken up to receive the node-level information;

The wake-up information carried in the second monitoring parameter configuration includes the node group-level wake-up information;

The wake-up information carried in the second monitoring parameter configuration includes the node-level wake-up information;

The wake-up information carried in the second monitoring parameter configuration includes wake-up information indicating the serial number of the node group that needs to be woken up;

The wake-up information carried in the second monitoring parameter configuration includes wake-up information indicating the serial number of the node that needs to be woken up;

The wake-up information carried in the second monitoring parameter configuration includes wake-up information indicating whether at least one node group needs to be woken up;

The wakeup information carried in the second monitoring parameter configuration includes wakeup information indicating whether at least one node needs to be woken up.

FIG. 8 is a schematic diagram of a wake-up indication when the first information is the first monitoring parameter configuration and the second information is the second monitoring parameter configuration.

Optionally, the first information and the second information in the target information are arranged alternately or sequentially.

Specifically, when the target information includes both the first information and the second information, and the first information and the second information are of the same type, the first information and the second information in the target information are arranged alternately or sequentially.

In other words, when both the first information and the second information exist, the first information and the second information may indicate corresponding wake-up information in sequence, or the first information and the second information may alternately indicate the corresponding wake-up information.

In other words, both the first information and the second information exist, and the resources indicated by the first information (including time domain resources, frequency domain resources and/or spatial domain resources) and the resources indicated by the second information have the same type, the resources indicated by the first information and the resources indicated by the second information are arranged alternately or sequentially. Or, when both the first information and the second information exist, and both the first information and the second information indicate bits, the bit indicated by the first information and the bit indicated by the second information are arranged alternately or sequentially.

Wherein, the target information may be configured by the network side device, therefore, the first information and the second information may be arranged alternately or sequentially, or may be configured by the network side device, but is not limited thereto.

Further, the first information and the second information in the target information are both time domain resource information, and when the first information and the second information are arranged alternately, the time domain resource indicated by the first information and the time domain resources indicated by the second information are arranged alternately;

For example, the first information indicates two parts of time domain resources, that is, the first time domain resource and the second time domain resource, and the second information also indicates two parts of time domain resources, that is, the third time domain resource and the fourth time domain resource. According to the time order, the first time domain resource is the earliest, the third time domain resource is next, the second time domain resource is behind the third time domain resource, and the fourth time domain resource is the last.

When both the first information and the second information in the target information are time domain resource information, and the first information and the second information are arranged sequentially, all time domain resources indicated by the first information are arranged before or after the time domain resource indicated by the second information;

For example, the first information indicates two parts of time domain resources, that is, the first time domain resource and the second time domain resource, and the second information also indicates two parts of time domain resources, that is, the third time domain resource and the fourth time domain resource. According to time order, the first time domain resource is the earliest, the second time domain resource is next, the third time domain resource is behind the second time domain resource, and the fourth time domain resource is the last.

Wherein, each part of time domain resources includes at least one of a sub-frame, a slot and a symbol, and sizes of the parts of time domain resources may be the same or different. The time domain resource in each part of the time domain resources may be continuous or discontinuous.

Regarding the alternate arrangement of the first information and the second information, for another example, the first time domain resource indicated by the first information is the first slot (slot #0), and the third time domain resource indicated by the second information is the second slot (slot #1) and the third slot (slot #2), and the second time domain resource indicated by the first information is the fourth slot (slot #3), the sixth slot (slot #5) and the seventh slot (slot #6), the fourth time domain resource indicated by the second information is the ninth slot (slot #8).

Regarding the sequential arrangement of the first information and the second information, for another example, the first time domain resource indicated by the first information is the first slot (slot #0), and the second time domain resource indicated by the first information is the second slot (slot #1) and the third slot (slot #2), and the third time domain resource indicated by the second information is the fourth slot (slot #3), the sixth slot (slot #5) and the seventh slot (slot #6), and the fourth time domain resource indicated by the second information is the ninth slot (slot #8).

When both the first information and the second information in the target information are frequency domain resource information, and the first information and the second information are arranged alternately, the frequency domain resource indicated by the first information and the frequency domain resources indicated by the second information are arranged alternately;

For example, the first information indicates two parts of frequency domain resources, that is, first frequency domain resource and second frequency domain resource, and the second information also indicates two parts of frequency domain resources, that is, third frequency domain resource and fourth frequency domain resource. When sorting frequency domain resources from small to large, the first frequency domain resource is the smallest, the third frequency domain resource is next, the second frequency domain resource is larger than the third frequency domain resource, and the fourth frequency domain resource is the largest.

When both the first information and the second information in the target information are frequency domain resource information, and the first information and the second information are arranged in sequence, frequencies of all frequency domain resources indicated by the first information are greater than or less than the frequency domain resource indicated by the second information;

For example, the first information indicates two parts of frequency domain resources, that is, first frequency domain resource and second frequency domain resource, and the second information also indicates two parts of frequency domain resources, that is, third frequency domain resource and fourth frequency domain resource. When sorting frequency domain resources from small to large, the first frequency domain resource is the smallest, the second frequency domain resource is next, the third frequency domain resource is larger than the second frequency domain resource, and the fourth frequency domain resource is the largest.

Wherein, each part of the frequency domain resources includes at least one of a carrier, BWP, RBG, RB, REG and RE, and the sizes of the parts of the frequency domain resources may be the same or different. The frequency domain resource in each part of the frequency domain resources may be continuous or discontinuous.

The first information and the second information are alternately arranged. For another example, the first frequency domain resource indicated by the first information is the first carrier (Carrier #0), and the third frequency domain resource indicated by the second information is the second carrier (Carrier #1) and the third carrier (Carrier #2), and the second frequency domain resource indicated by the first information is the fourth carrier (Carrier #3), the sixth carrier (Carrier #5) and the seventh carrier (Carrier #6), the fourth frequency domain resource indicated by the second information is the ninth carrier (Carrier #8).

Regarding the sequential arrangement of the first information and the second information, for another example, the first frequency domain resource indicated by the first information is the first carrier (Carrier #0), and the second frequency domain resource indicated by the first information is the second carrier (Carrier #1) and the third carrier (Carrier #2), and the third frequency domain resources indicated by the second information are the fourth carrier (Carrier #3), the sixth carrier (Carrier #5) and the seventh carrier (Carrier #6), the fourth frequency domain resource indicated by the second information is the ninth carrier (Carrier #8).

When both the first information and the second information in the target information are spatial domain resource information, and the first information and the second information are arranged alternately, the spatial domain resource indicated by the first information and the spatial domain resource indicated by the second information are arranged alternately in term of the serial numbers;

For example, the first information indicates two parts of spatial domain resources, that is, the first spatial domain resource and the second spatial domain resource, and the second information also indicates two parts of spatial domain resources, that is, the third spatial domain resource and the fourth spatial domain resource. When the serial numbers are sorted from small to large, the first spatial domain resource is the first, the third spatial domain resource is next, the second spatial domain resource is behind the third spatial domain resource, and the fourth spatial domain resource is the last.

The first information and the second information in the target information are both spatial domain resource information, and when the first information and the second information are arranged in sequence, the serial number of all spatial domain resources indicated by the first information are before or after the serial numbers of the spatial domain resources indicated by the second information;

For example, the first information indicates two parts of spatial domain resources, that is, the first spatial domain resource and the second spatial domain resource, and the second information also indicates two parts of spatial domain resources, that is, the third spatial domain resource and the fourth spatial domain resource. When the serial numbers are sorted from small to large, the first spatial domain resource is the first, the second spatial domain resource is next, the third spatial domain resource is behind the second spatial domain resource, and the fourth spatial domain resource is the last.

Wherein, each part of spatial domain resources includes at least one of TRP, an antenna port, an antenna and a beam, and the sizes of the parts of spatial domain resources may be the same or different.

Regarding the alternate arrangement of the first information and the second information, for another example, the first spatial domain resource indicated by the first information is the first beam (Beam #0), and the third spatial domain resource indicated by the second information are the second beam (Beam #1) and the third beam (Beam #2), and the second spatial domain resources indicated by the first information are the fourth beam (Beam #3), the sixth beam (Beam #5) and the seventh beam (Beam #6), the fourth spatial domain resource indicated by the second information is the ninth beam (Beam #8).

Regarding the sequence arrangement of the first information and the second information, for another example, the first spatial domain resource indicated by the first information is the first beam (Beam #0), and the second spatial domain resource indicated by the first information is the second beam (Beam #1) and the third beam (Beam #2), the third spatial domain resource indicated by the second information is the fourth beam (Beam #3), the sixth beam (Beam #5) and the seventh beam (Beam #6), the fourth spatial domain resource indicated by the second information is the ninth beam (Beam #8).

When both the first information and the second information in the target information are bit information, and the first information and the second information are arranged alternately, the bit indicated by the first information and the bit indicated by the second information are arranged alternately;

For example, the first information indicates two parts of bits, that is, the first bit and the second bit, and the second information also indicates two parts of bits, that is, the third bit and the fourth bit. When sorting bits from front to back, the first bit is the first, the third bit is next, the second bit is behind the third bit, and the fourth bit is the last.

The first information and the second information in the target information are both bit information, and when the first information and the second information are arranged in sequence, all the bits indicated by the first information are before or after the bit indicated by the second information.

For example, the first information indicates two parts of bits, that is, the first bit and the second bit, and the second information also indicates two parts of bits, that is, the third bit and the fourth bit. When sorting bits from front to back, the first bit is the first, the second bit is next, the third bit is behind the second bit, and the fourth bit is the last.

Wherein, the number of bits in each part may be the same or different.

Regarding the alternate arrangement of the first information and the second information, for another example, the first bit indicated by the first information is the first bit (Bit #0), and the third bit indicated by the second information is the second bit (Bit #1) and the third bit (Bit #2), the second bit indicated by the first information is the fourth bit (Bit #3), the sixth bit (Bit #5) and the seventh bit (Bit #6), the fourth bit indicated by the second information is the ninth bit (Bit #8).

Regarding the sequence arrangement of the first information and the second information, for another example, the first bit indicated by the first information is the first bit (Bit #0), and the second bit indicated by the first information is the second bit (Bit #1) and the third bit (Bit #2), the third bit indicated by the second information is the fourth bit (Bit #3), the sixth bit (Bit #5) and the seventh bit (Bit #6), and the fourth bit indicated by the second information is the ninth bit (Bit #8).

FIG. 9 is a flow chart of a signal sending method provided by an embodiment of the present disclosure. The method is applied to a network side device and includes the following steps:

901. Configuring, by the network side device, target information, wherein the target information includes first information and/or second information;

902. Sending, by the network side device, wake-up information through the target information, wherein the wake-up information sent through the first information includes at least one of area-level wake-up information, cell-level wake-up information, or node group-level wake-up information, wake-up information sent through the second information includes at least one of node group-level wake-up information or node-level wake-up information.

In other words, the network side device sends wake-up information according to the target information, wherein the wake-up information sent according to the first information includes at least one of area-level wake-up information, cell-level wake-up information, and node group-level wake-up information, the wake-up information sent according to the second information includes at least one of node group-level wake-up information and node-level wake-up information.

It should be noted that the network side device can be a base station, such as: macro base station, LTE eNB, 5G NR NB, etc.; the network side device can also be a small station, such as low power node (LPN), pico, femto, etc. or a network side device can be an access point (AP); a base station can also be a network node composed by a central unit (CU) and a plurality of transmission reception points (TRP) managed and controlled by the CU. It should be noted that, in the embodiment of the present disclosure, the specific type of the network side device is not limited.

In the embodiments of the present disclosure, the first information and/or the second information can be used to indicate different levels of wake-up information, so that the network side can indicate different levels of wake-up information separately. If it is area-level or cell-level wake-up information, they can only be indicated on one resource, and all nodes (including terminals) will monitor the resource, and there is no necessary to send area-level wake-up information or cell-level wake-up information to each node, which can greatly reduce the signaling overhead of the base station for the wake-up indication.

The following example illustrates the signal sending method.

First, after the network side device sends the wake-up information through the target information, if the purpose of the wake-up information is to wake up one node or a plurality of nodes, then it also needs to send related signals, such as PDCCH, PDSCH and/or reference signal.

Wherein, the configuration of the first information and the configuration of the second information may be completely the same, partially the same or different.

Optionally, the first information includes at least one of time domain resource information, frequency domain resource information, spatial domain resource information, sequence information, bit information, and monitoring parameter configuration information;

The second information includes at least one of time domain resource information, frequency domain resource information, spatial domain resource information, sequence information, bit information, and monitoring parameter configuration information.

Specifically, when the first information includes at least one of time domain resource information, frequency domain resource information, and spatial domain resource information, the step of sending wake-up information according to the target information specifically includes sending the wake-up information through the resource indicated by the target information. When the first information includes at least one of sequence information, bit information, and monitoring parameter configuration information, the step of sending wake-up information according to the target information specifically includes sending the sequence and/or bit and/or monitoring parameter configuration indicated by the target information, and indicating the wake-up information by using the sequence and/or bit and/or monitoring parameter configuration.

Optionally, the area-level wake-up information is used to indicate at least one of the following:

Whether area-level information exists;

Whether to wake up all nodes in a target area to receive the area-level information;

Waking up all nodes in the target area to receive the area-level information;

a type of information to be received including the area-level information;

a type of short message;

a type of a system message to be updated;

Whether to update the system message.

Optionally, the cell-level wake-up information is used to indicate at least one of the following:

Whether cell-level information exists;

Whether to wake up all nodes in a target area to receive the cell-level information;

Waking up all nodes in the target area to receive the cell-level information;

a type of information to be received including the cell-level information;

a type of short message;

a type of a system message to be updated;

Whether to update the system message.

Optionally, the node group-level wake-up information is used to indicate at least one of the following:

Whether node group-level information exists;

Whether to wake up all nodes in a target node group to receive the node group-level information;

Waking up all nodes in the target node group to receive node group-level information;

a type of information to be received including the node group-level information;

a serial number of a node group to be woken up;

Whether to wake up at least one node group.

Optionally, the node-level wake-up information is used to indicate at least one of the following:

Whether node-level information exists;

Whether to wake up a target node to receive the node-level information;

Waking up the target node to receive the node-level information;

a type of information to be received including the node-level information;

a serial number of a node to be woken up;

Whether to wake up at least one node.

Optionally, the area-level information includes at least one of a broadcast message, a short message, and other information of PDSCH scheduled by DCI not scrambled by P-RNTI.

Optionally, the cell-level information includes at least one of a broadcast message, a short message, and other information of PDSCH scheduled by DCI not scrambled by P-RNTI.

Optionally, the node group-level information includes at least one of a broadcast message, a short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message;

Wherein, the first message is used to instruct the node to stop monitoring PO.

Optionally, the target information is based on high-layer signaling configuration, RRC signaling configuration, dynamic signaling configuration, pre-defined configuration or broadcast configuration.

That is to say, the configuration of the first information and/or the second information may be based on high-layer signaling, may be based on RRC signaling, may be based on dynamic signaling, or may be based on predefined, and can also be based on broadcast.

Optionally, the first information and the second information in the target information are arranged alternately or sequentially.

Specifically, the target information may be configured by the network side device, therefore, the first information and the second information may be arranged alternately or sequentially, or may be configured by the network side device, but is not limited thereto.

Optionally, when both the first information and the second information in the target information are time domain resource information, and the first information and the second information are arranged alternately, the time domain resource indicated by the first information and the time domain resource indicated by the second information are alternately arranged;

When both the first information and the second information in the target information are time domain resource information, and the first information and the second information are arranged sequentially, all time domain resources indicated by the first information are arranged before or after the time domain resource indicated by the second information;

When both the first information and the second information in the target information are frequency domain resource information, and the first information and the second information are arranged alternately, the frequency domain resource indicated by the first information and the frequency domain resource indicated by the second information are arranged alternately;

When both the first information and the second information in the target information are frequency domain resource information, and the first information and the second information are arranged sequentially, all frequency domain resources indicated by the first information are greater than or less than the frequency domain resources indicated by the second information;

When both the first information and the second information in the target information are spatial domain resource information, and the first information and the second information are arranged alternately, the spatial domain resource indicated by the first information and the spatial domain resource indicated by the second information are arranged alternately in terms of the serial number;

When both the first information and the second information in the target information are spatial domain resource information, and the first information and the second information are arranged in sequence, the serial numbers of all spatial domain resources indicated by the first information are before or after the serial numbers of the spatial domain resources indicated by the second information;

When both the first information and the second information in the target information are bit information, and the first information and the second information are arranged alternately, the bit indicated by the first information and the bit indicated by the second information are arranged alternately;

The first information and the second information in the target information are both bit information, and when the first information and the second information are arranged in sequence, all the bits indicated by the first information are before or after the bit indicated by the second information.

It should be noted that this embodiment is an implementation applied to network side device corresponding to the above-mentioned embodiment of the signal receiving method applied to the node side, the implementation may refer to the above embodiment, and the embodiment will not be described in detail to avoid repetition, and the same beneficial effect can also be achieved.

Figure 10:
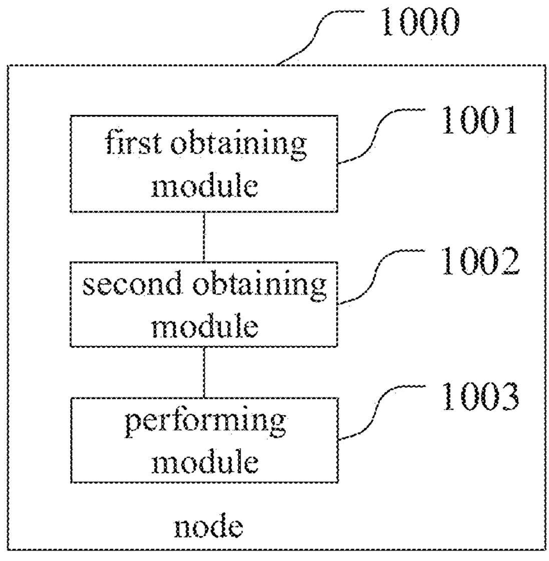
FIG. 10 is a schematic structural diagram of a node in an embodiment of the present disclosure.

FIG. 10 is a structural diagram of a node provided by another embodiment of the present disclosure. As shown in FIG. 10, a node 1000 includes:

a first obtaining module 1001, configured to obtain target information, wherein the target information includes first information and/or second information;

a second obtaining module 1002, configured to obtain wake-up information according to the target information, wherein the wake-up information obtained according to the first information includes at least one of area-level wake-up information, cell-level wake-up information, or node group-level wake-up information, wake-up information obtained according to the second information includes at least one of node group-level wake-up information and node-level wake-up information;

A performing module 1003, configured to perform waking up or continuing to sleep of the node according to indication of the wake-up information.

Optionally, the node 1000 also includes:

a receiving module, configured to determine whether to receive physical downlink shared channel (PDSCH) according to the indication of the wake-up information.

Optionally, the receiving module is configured to, if the wake-up information obtained according to the target information includes at least one of the node group-level wake-up information and the node-level wake-up information, receive the PDSCH scheduled by the DCI scrambled by the P-RNTI; otherwise, not receive the PDSCH scheduled by the DCI scrambled by the P-RNTI.

Optionally, the first information includes at least one of time domain resource information, frequency domain resource information, spatial domain resource information, sequence information, bit information, and monitoring parameter configuration information;

The second information includes at least one of time domain resource information, frequency domain resource information, spatial domain resource information, sequence information, bit information, and monitoring parameter configuration information.

Optionally, the area-level wake-up information is used to indicate at least one of the following:

Whether area-level information exists;

Whether to wake up all nodes in a target area to receive the area-level information;

Waking up all nodes in the target area to receive the area-level information;

a type of information to be received including the area-level information;

a type of short message;

a type of a system message to be updated;

Whether to update the system message.

Optionally, the cell-level wake-up information is used to indicate at least one of the following:

Whether cell-level information exists;

Whether to wake up all nodes in a target area to receive the cell-level information;

Waking up all nodes in the target area to receive the cell-level information;

a type of information to be received including the cell-level information;

a type of short message;

a type of a system message to be updated;

Whether to update the system message.

Optionally, the node group-level wake-up information is used to indicate at least one of the following:

Whether node group-level information exists;

Whether to wake up all nodes in a target node group to receive the node group-level information;

Waking up all nodes in the target node group to receive node group-level information;

a type of information to be received including the node group-level information;

a serial number of a node group to be woken up;

Whether to wake up at least one node group.

Optionally, the node-level wake-up information is used to indicate at least one of the following:

Whether node-level information exists;

Whether to wake up a target node to receive the node-level information;

Waking up the target node to receive the node-level information;

a type of information to be received including the node-level information;

a serial number of a node to be woken up;

Whether to wake up at least one node.

Optionally, the area-level information includes at least one of a broadcast message, a short message, and other information of PDSCH scheduled by DCI not scrambled by P-RNTI.

Optionally, the cell-level information includes at least one of a broadcast message, a short message, and other information of PDSCH scheduled by DCI not scrambled by P-RNTI.

Optionally, the node group-level information includes at least one of a broadcast message, a short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message;

Wherein, the first message is used to instruct the node to stop monitoring PO.

Optionally, the first information and the second information in the target information are arranged alternately or sequentially.

Optionally, when both the first information and the second information in the target information are time domain resource information, and the first information and the second information are arranged alternately, the time domain resource indicated by the first information and the time domain resource indicated by the second information are alternately arranged;

When both the first information and the second information in the target information are time domain resource information, and the first information and the second information are arranged sequentially, all time domain resources indicated by the first information are arranged before or after the time domain resource indicated by the second information;

When both the first information and the second information in the target information are frequency domain resource information, and the first information and the second information are arranged alternately, the frequency domain resource indicated by the first information and the frequency domain resource indicated by the second information are arranged alternately;

When both the first information and the second information in the target information are frequency domain resource information, and the first information and the second information are arranged sequentially, all frequency domain resources indicated by the first information are greater than or less than the frequency domain resources indicated by the second information;

When both the first information and the second information in the target information are spatial domain resource information, and the first information and the second information are arranged alternately, the spatial domain resource indicated by the first information and the spatial domain resource indicated by the second information are arranged alternately in terms of the serial number;

When both the first information and the second information in the target information are spatial domain resource information, and the first information and the second information are arranged in sequence, the serial numbers of all spatial domain resources indicated by the first information are before or after the serial numbers of the spatial domain resources indicated by the second information;

When both the first information and the second information in the target information are bit information, and the first information and the second information are arranged alternately, the bit indicated by the first information and the bit indicated by the second information are arranged alternately;

The first information and the second information in the target information are both bit information, and when the first information and the second information are arranged in sequence, all the bits indicated by the first information are before or after the bit indicated by the second information.

Optionally, the monitoring parameters include at least one of CORESET resources, search space resources, PDCCH candidate resources, symbols of CORESET resources, and resource blocks of CORESET resources.

It should be noted that the above-mentioned node 1000 in this embodiment can be a node in any implementation in the method embodiment of the present disclosure, and any implementation of the node in the method embodiment of the present disclosure can be used in the node 1000 in the embodiment, the same beneficial effect is achieved, which will not be repeated here.

Figure 11:
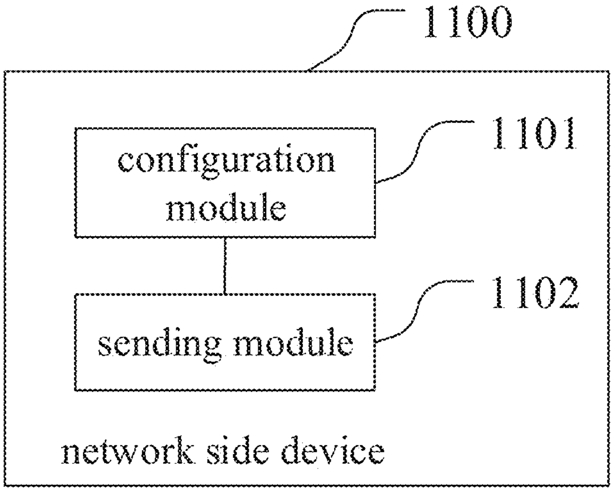
FIG. 11 is a schematic structural diagram of a network side device in an embodiment of the present disclosure.

FIG. 11 is a structural diagram of a network side device provided in an embodiment of the present disclosure. As shown in FIG. 11, the network side device 1100 includes:

A configuration module 1101, configured to configure target information, wherein the target information includes first information and/or second information;

A sending module 1102, configured to send wake-up information through the target information, wherein the wake-up information sent through the first information includes at least one of area-level wake-up information, cell-level wake-up information, or node group-level wake-up information, wake-up information sent through the second information includes at least one of node group-level wake-up information or node-level wake-up information.

Optionally, the first information includes at least one of time domain resource information, frequency domain resource information, spatial domain resource information, sequence information, bit information, and monitoring parameter configuration information;

The second information includes at least one of time domain resource information, frequency domain resource information, spatial domain resource information, sequence information, bit information, and monitoring parameter configuration information.

Optionally, the area-level wake-up information is used to indicate at least one of the following:

Whether area-level information exists;

Whether to wake up all nodes in a target area to receive the area-level information;

Waking up all nodes in the target area to receive the area-level information;

a type of information to be received including the area-level information;

a type of short message;

a type of a system message to be updated;

Whether to update the system message.

Optionally, the cell-level wake-up information is used to indicate at least one of the following:

Whether cell-level information exists;

Whether to wake up all nodes in a target area to receive the cell-level information;

Waking up all nodes in the target area to receive the cell-level information;

a type of information to be received including the cell-level information;

a type of short message;

a type of a system message to be updated;

Whether to update the system message.

Optionally, the node group-level wake-up information is used to indicate at least one of the following:

Whether node group-level information exists;

Whether to wake up all nodes in a target node group to receive the node group-level information;

Waking up all nodes in the target node group to receive node group-level information;

a type of information to be received including the node group-level information;

a serial number of a node group to be woken up;

Whether to wake up at least one node group.

Optionally, the node-level wake-up information is used to indicate at least one of the following:

Whether node-level information exists;

Whether to wake up a target node to receive the node-level information;

Waking up the target node to receive the node-level information;

a type of information to be received including the node-level information;

a serial number of a node to be woken up;

Whether to wake up at least one node.

Optionally, the area-level information includes at least one of a broadcast message, a short message, and other information of PDSCH scheduled by DCI not scrambled by P-RNTI.

Optionally, the cell-level information includes at least one of a broadcast message, a short message, and other information of PDSCH scheduled by DCI not scrambled by P-RNTI.

Optionally, the node group-level information includes at least one of a broadcast message, a short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message;

Wherein, the first message is used to instruct the node to stop monitoring PO.

Optionally, the target information is based on high-layer signaling configuration, RRC signaling configuration, dynamic signaling configuration, pre-defined configuration or broadcast configuration.

Optionally, the first information and the second information in the target information are arranged alternately or sequentially.

Optionally, when both the first information and the second information in the target information are time domain resource information, and the first information and the second information are arranged alternately, the time domain resource indicated by the first information and the time domain resource indicated by the second information are alternately arranged;

When both the first information and the second information in the target information are time domain resource information, and the first information and the second information are arranged sequentially, all time domain resources indicated by the first information are arranged before or after the time domain resource indicated by the second information;

When both the first information and the second information in the target information are frequency domain resource information, and the first information and the second information are arranged alternately, the frequency domain resource indicated by the first information and the frequency domain resource indicated by the second information are arranged alternately;

When both the first information and the second information in the target information are frequency domain resource information, and the first information and the second information are arranged sequentially, all frequency domain resources indicated by the first information are greater than or less than the frequency domain resources indicated by the second information;

When both the first information and the second information in the target information are spatial domain resource information, and the first information and the second information are arranged alternately, the spatial domain resource indicated by the first information and the spatial domain resource indicated by the second information are arranged alternately in terms of the serial number;

When both the first information and the second information in the target information are spatial domain resource information, and the first information and the second information are arranged in sequence, the serial numbers of all spatial domain resources indicated by the first information are before or after the serial numbers of the spatial domain resources indicated by the second information;

When both the first information and the second information in the target information are bit information, and the first information and the second information are arranged alternately, the bit indicated by the first information and the bit indicated by the second information are arranged alternately;

When both the first information and the second information in the target information are bit information, and the first information and the second information are arranged in sequence, all the bits indicated by the first information are before or after the bit indicated by the second information.

It should be noted that the network side device 1100 in this embodiment may be the network side device in any implementation in the method embodiments of the present disclosure, and any implementation of the network side device in the method embodiments of the present disclosure can be realized by the above-mentioned network side device 1100 in this embodiment, and achieve the same beneficial effect, so it will not be repeated here.

Figure 12:
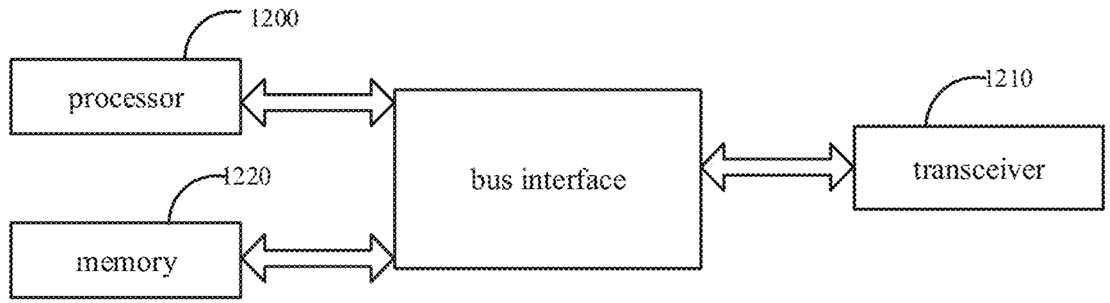
FIG. 12 is a schematic structural diagram of a node in an embodiment of the present disclosure.

FIG. 12 is another structural diagram of a node according to an embodiment of the present disclosure. As shown in FIG. 12, the node includes: a transceiver 1210, a memory 1220, a processor 1200 and a computer program that can run on the processor 1200, wherein the processor 1200 implements the following steps when executing the computer program:

obtaining target information, wherein the target information includes first information and/or second information;

Obtaining wake-up information according to the target information, wherein the wake-up information obtained according to the first information includes at least one of area-level wake-up information, cell-level wake-up information, or node group-level wake-up information, wake-up information obtained according to the second information includes at least one of node group-level wake-up information and node-level wake-up information;

performing waking up or continuing to sleep of the node according to indication of the wake-up information.

Wherein, the transceiver 1210 may be used to receive and send data under the control of the processor 1200.

In FIG. 12, the bus architecture may include any number of interconnected buses and bridges, specifically various circuits of one or more processors represented by processor 1200 and memory represented by memory 1220 are linked together. The bus architecture can also link together various other circuits such as peripherals, voltage regulators, and power management circuits, etc., which are well known in the art and therefore will not be further described herein. The bus interface provides the interface. Transceiver 1210 may be a plurality of elements, including a transmitter and a receiver, providing a means for communicating with various other devices over transmission media.

The processor 1200 is responsible for managing the bus architecture and general processing, and the memory 1220 can store data used by the processor 1200 when performing operations.

It should be noted that the memory 1220 is not limited to be only on the node, and the memory 1220 and the processor 1200 may be separated and located in different geographic locations.

Optionally, when the processor 1200 executes the computer program, the following steps may also be implemented:

After the obtaining the wake-up information according to the target information, it also includes:

Determining whether to receive physical downlink shared channel (PDSCH) according to the indication of the wake-up information.

Optionally, when the processor 1200 executes the computer program, the following steps may also be implemented:

The determining whether to receive the PDSCH according to the indication of the wake-up information includes:

if the wake-up information obtained according to the target information includes at least one of the node group-level wake-up information and the node-level wake-up information, receiving the PDSCH scheduled by the DCI scrambled by the P-RNTI; otherwise, not receiving the PDSCH scheduled by the DCI scrambled by the P-RNTI.

Optionally, the first information includes at least one of time domain resource information, frequency domain resource information, spatial domain resource information, sequence information, bit information, and monitoring parameter configuration information;

The second information includes at least one of time domain resource information, frequency domain resource information, spatial domain resource information, sequence information, bit information, and monitoring parameter configuration information.

Optionally, the area-level wake-up information is used to indicate at least one of the following:

Whether area-level information exists;

Whether to wake up all nodes in a target area to receive the area-level information;

Waking up all nodes in the target area to receive the area-level information;

a type of information to be received including the area-level information;

a type of short message;

a type of a system message to be updated;

Whether to update the system message.

Optionally, the cell-level wake-up information is used to indicate at least one of the following:

Whether cell-level information exists;

Whether to wake up all nodes in a target area to receive the cell-level information;

Waking up all nodes in the target area to receive the cell-level information;

a type of information to be received including the cell-level information;

a type of short message;

a type of a system message to be updated;

Whether to update the system message.

Optionally, the node group-level wake-up information is used to indicate at least one of the following:

Whether node group-level information exists;

Whether to wake up all nodes in a target node group to receive the node group-level information;

Waking up all nodes in the target node group to receive node group-level information;

a type of information to be received including the node group-level information;

a serial number of a node group to be woken up;

Whether to wake up at least one node group.

Optionally, the node-level wake-up information is used to indicate at least one of the following:

Whether node-level information exists;

Whether to wake up a target node to receive the node-level information;

Waking up the target node to receive the node-level information;

a type of information to be received including the node-level information;

a serial number of a node to be woken up;

Whether to wake up at least one node.

Optionally, the area-level information includes at least one of a broadcast message, a short message, and other information of PDSCH scheduled by DCI not scrambled by P-RNTI.

Optionally, the cell-level information includes at least one of a broadcast message, a short message, and other information of PDSCH scheduled by DCI not scrambled by P-RNTI.

Optionally, the node group-level information includes at least one of a broadcast message, a short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message;

Wherein, the first message is used to instruct the node to stop monitoring PO.

Optionally, the first information and the second information in the target information are arranged alternately or sequentially.

Optionally, when both the first information and the second information in the target information are time domain resource information, and the first information and the second information are arranged alternately, the time domain resource indicated by the first information and the time domain resource indicated by the second information are alternately arranged;

When both the first information and the second information in the target information are time domain resource information, and the first information and the second information are arranged sequentially, all time domain resources indicated by the first information are arranged before or after the time domain resource indicated by the second information;

When both the first information and the second information in the target information are frequency domain resource information, and the first information and the second information are arranged alternately, the frequency domain resource indicated by the first information and the frequency domain resource indicated by the second information are arranged alternately;

When both the first information and the second information in the target information are frequency domain resource information, and the first information and the second information are arranged sequentially, all frequency domain resources indicated by the first information are greater than or less than the frequency domain resources indicated by the second information;

When both the first information and the second information in the target information are spatial domain resource information, and the first information and the second information are arranged alternately, the spatial domain resource indicated by the first information and the spatial domain resource indicated by the second information are arranged alternately in terms of the serial number;

When both the first information and the second information in the target information are spatial domain resource information, and the first information and the second information are arranged in sequence, the serial numbers of all spatial domain resources indicated by the first information are before or after the serial numbers of the spatial domain resources indicated by the second information;

When both the first information and the second information in the target information are bit information, and the first information and the second information are arranged alternately, the bit indicated by the first information and the bit indicated by the second information are arranged alternately;

When both the first information and the second information in the target information are bit information, and the first information and the second information are arranged in sequence, all the bits indicated by the first information are before or after the bit indicated by the second information.

Optionally, the monitoring parameters include at least one of CORESET resources, search space resources, PDCCH candidate resources, symbols of CORESET resources, and resource blocks of CORESET resources.

It should be noted that the above-mentioned node in this embodiment can be nodes in any implementation in the method embodiments of the present disclosure, and any implementation of the nodes in the method embodiments of the disclosure can be replaced by the nodes in the embodiment of the present disclosure, the same beneficial effect is achieved, which will not be repeated here.

Figure 13:
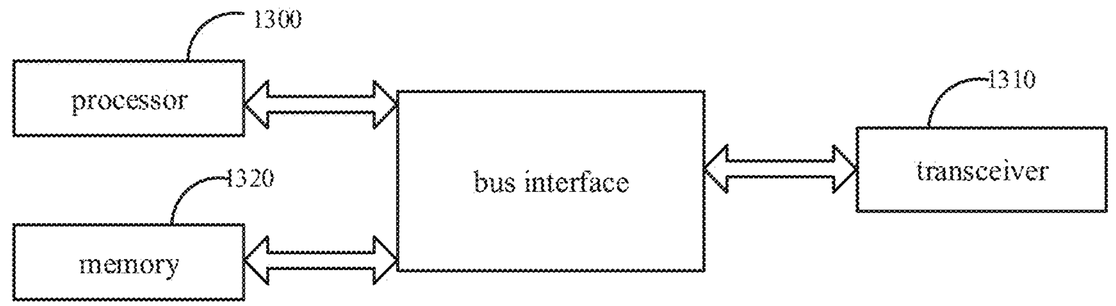
FIG. 13 is a schematic structural diagram of a network side device in an embodiment of the present disclosure.

FIG. 13 is another structural diagram of the network side device provided by an embodiment of the present disclosure. As shown in FIG. 13, the network side device includes: a transceiver 1310, a memory 1320, a processor 1300 and a computer program stored on the memory 1320 and executed by the processor, wherein the processor implements the following steps when executing the computer program:

configuring target information, wherein the target information includes first information and/or second information;

sending wake-up information through the target information, wherein the wake-up information sent through the first information includes at least one of area-level wake-up information, cell-level wake-up information, or node group-level wake-up information, wake-up information sent through the second information includes at least one of node group-level wake-up information or node-level wake-up information.

Wherein, the transceiver 1310 may be used to receive and send data under the control of the processor 1300.

In FIG. 13, the bus architecture may include any number of interconnected buses and bridges, specifically various circuits of one or more processors represented by processor 1300 and memory represented by memory 1320 are linked together. The bus architecture can also link together various other circuits such as peripherals, voltage regulators, and power management circuits, etc., which are well known in the art and therefore will not be further described herein. The bus interface provides the interface. Transceiver 1310 may be a plurality of elements, including a transmitter and a receiver, providing a means for communicating with various other devices over transmission media.

The processor 1300 is responsible for managing the bus architecture and general processing, and the memory 1320 can store data used by the processor 1300 when performing operations.

It should be noted that the memory 1320 is not limited to be only on the network side device, and the memory 1320 and the processor 1300 may be separated and located in different geographic locations.

Optionally, the first information includes at least one of time domain resource information, frequency domain resource information, spatial domain resource information, sequence information, bit information, and monitoring parameter configuration information;

The second information includes at least one of time domain resource information, frequency domain resource information, spatial domain resource information, sequence information, bit information, and monitoring parameter configuration information.

Optionally, the area-level wake-up information is used to indicate at least one of the following:

Whether area-level information exists;

Whether to wake up all nodes in a target area to receive the area-level information;

Waking up all nodes in the target area to receive the area-level information;

a type of information to be received including the area-level information;

a type of short message;

a type of a system message to be updated;

Whether to update the system message.

Optionally, the cell-level wake-up information is used to indicate at least one of the following:

Whether cell-level information exists;

Whether to wake up all nodes in a target area to receive the cell-level information;

Waking up all nodes in the target area to receive the cell-level information;

a type of information to be received including the cell-level information;

a type of short message;

a type of a system message to be updated;

Whether to update the system message.

Optionally, the node group-level wake-up information is used to indicate at least one of the following:

Whether node group-level information exists;

Whether to wake up all nodes in a target node group to receive the node group-level information;

Waking up all nodes in the target node group to receive node group-level information;

a type of information to be received including the node group-level information;

a serial number of a node group to be woken up;

Whether to wake up at least one node group.

Optionally, the node-level wake-up information is used to indicate at least one of the following:

Whether node-level information exists;

Whether to wake up a target node to receive the node-level information;

Waking up the target node to receive the node-level information;

a type of information to be received including the node-level information;

a serial number of a node to be woken up;

Whether to wake up at least one node.

Optionally, the area-level information includes at least one of a broadcast message, a short message, and other information of PDSCH scheduled by DCI not scrambled by P-RNTI.

Optionally, the cell-level information includes at least one of a broadcast message, a short message, and other information of PDSCH scheduled by DCI not scrambled by P-RNTI.

Optionally, the node group-level information includes at least one of a broadcast message, a short message, a paging message, other information of PDSCH scheduled by DCI scrambled by P-RNTI or other information of PDSCH scheduled by DCI not scrambled by P-RNTI.

Optionally, the node-level information includes at least one of a paging message or other information of PDSCH scheduled by DCI scrambled by P-RNTI.

Optionally, the short message includes at least one of system message update, an alert message or a first message;

Wherein, the first message is used to instruct the node to stop monitoring PO.

Optionally, the target information is based on high-layer signaling configuration, RRC signaling configuration, dynamic signaling configuration, pre-defined configuration or broadcast configuration.

Optionally, the first information and the second information in the target information are arranged alternately or sequentially.

Optionally, when both the first information and the second information in the target information are time domain resource information, and the first information and the second information are arranged alternately, the time domain resource indicated by the first information and the time domain resource indicated by the second information are alternately arranged;

When both the first information and the second information in the target information are time domain resource information, and the first information and the second information are arranged sequentially, all time domain resources indicated by the first information are arranged before or after the time domain resource indicated by the second information;

When both the first information and the second information in the target information are frequency domain resource information, and the first information and the second information are arranged alternately, the frequency domain resource indicated by the first information and the frequency domain resource indicated by the second information are arranged alternately;

When both the first information and the second information in the target information are frequency domain resource information, and the first information and the second information are arranged sequentially, all frequency domain resources indicated by the first information are greater than or less than the frequency domain resources indicated by the second information;

When both the first information and the second information in the target information are spatial domain resource information, and the first information and the second information are arranged alternately, the spatial domain resource indicated by the first information and the spatial domain resource indicated by the second information are arranged alternately in terms of the serial number;

When both the first information and the second information in the target information are spatial domain resource information, and the first information and the second information are arranged in sequence, the serial numbers of all spatial domain resources indicated by the first information are before or after the serial numbers of the spatial domain resources indicated by the second information;

When both the first information and the second information in the target information are bit information, and the first information and the second information are arranged alternately, the bit indicated by the first information and the bit indicated by the second information are arranged alternately;

When both the first information and the second information in the target information are both bit information, and the first information and the second information are arranged in sequence, all the bits indicated by the first information are before or after the bit indicated by the second information.

It should be noted that the above-mentioned network side device in this embodiment may be the network side device in any implementation in the method embodiment of the present disclosure, and any implementation of the network side device in the method embodiment of the disclosure may be realized by the above-mentioned network side device in this embodiment, and achieves the same beneficial effect, which will not be repeated here.

The embodiment of the present disclosure also provides a computer-readable storage medium, on which a computer program is stored, and when the computer program is executed by a processor, the steps in the signal receiving method at the node side provided by the embodiment of the present disclosure are implemented, or when the program is executed by the processor, the steps in the signal sending method at the network side device side provided by the embodiments of the present disclosure are implemented.

In the several embodiments provided in this present disclosure, it should be understood that the disclosed methods and devices may be implemented in other ways. For example, the device embodiments described above are only illustrative. For example, the division of the units is only a logical function division. In actual implementation, there may be other division methods. For example, a plurality of units or components can be combined or integrated into another system, or some features may be ignored, or not implemented. In another point, the mutual coupling or direct coupling or communication connection shown or discussed may be through some interfaces, and the indirect coupling or communication connection of devices or units may be in electrical, mechanical or other forms.

In addition, each functional unit in each embodiment of the present disclosure may be integrated into one processing unit, each unit may be physically included separately, or two or more units may be integrated into one unit. The above-mentioned integrated units can be implemented in the form of hardware, or in the form of hardware plus software functional units.

The above-mentioned integrated units implemented in the form of software functional units may be stored in a computer-readable storage medium. The above-mentioned software functional unit is stored in a storage medium, including several instructions to make a computer device (which may be a personal computer, server, or network device, etc.) execute part of the method for processing information data blocks described in various embodiments of the present disclosure. The aforementioned storage media include: U disk, mobile hard disk, read-only memory (ROM), random access memory (RAM), magnetic disk or optical disk and other media that can store program codes.

Each module, unit, subunit or submodule may be one or more integrated circuits configured to implement the above method, for example: one or more Application Specific Integrated Circuit (ASIC), or, one or more microprocessor (digital signal processor, DSP), or, one or more field programmable gate array (FPGA), etc. For another example, when one of the above modules is implemented in the form of a processing element scheduling program code, the processing element may be a general-purpose processor, such as a central processing unit (CPU) or other processors that can call program codes. For another example, these modules can be integrated together and implemented in the form of a system-on-a-chip (SOC).

The above are optional embodiments of the present disclosure. It should be pointed out that for those skilled in the art, several improvements and modifications can be made without departing from the principles of the present disclosure, and these improvements and modifications should also be regarded as the protection scope of the present disclosure.

What is claimed is:

1. A signal receiving method, applied to a node, comprising:

obtaining target information, wherein the target information includes first information, or first information and second information;

obtaining wake-up information according to the target information, wherein the wake-up information obtained according to the first information includes at least one of area-level wake-up information, cell-level wake-up information, or node group-level wake-up information, wake-up information obtained according to the second information includes at least one of the node group-level wake-up information and node-level wake-up information;

performing waking up or continuing to sleep according to indication of the wake-up information;

wherein when the first information includes first sequence information and the second information includes second sequence information, the first sequence information and the second sequence information are configured to indicate the wake-up information;

wherein the area-level wake-up information is used to indicate at least one of the following:

whether area-level information exists;

whether to wake up all nodes in a target area to receive the area-level information;

waking up all nodes in the target area to receive the area-level information;

a type of information to be received including the area-level information;

a type of a short message;

a type of a system message to be updated; or whether to update the system message;

wherein the cell-level wake-up information is used to indicate at least one of the following:

whether cell-level information exists;

whether to wake up all nodes in a target area to receive the cell-level information;

waking up all nodes in the target area to receive the cell-level information;

a type of a short message;

a type of a system message to be updated; or whether to update the system message;

wherein the node group-level wake-up information is used to indicate at least one of the following:

whether node group-level information exists;

whether to wake up all nodes in a target node group to receive the node group-level information;

waking up all nodes in the target node group to receive the node group-level information;

a type of information to be received including the node group-level information;

a serial number of a node group to be woken up; or whether to wake up at least one node group;

wherein the node-level wake-up information is used to indicate at least one of the following:

whether node-level information exists;

whether to wake up a target node to receive the node-level information;

waking up the target node to receive the node-level information;

a type of information to be received including the node-level information;

a serial number of a node to be woken up; or whether to wake up at least one node;

wherein the first information and the second information in the target information are arranged alternately or sequentially;

wherein when both the first information and the second information in the target information are time domain resource information, and the first information and the second information are arranged alternately, a time domain resource indicated by the first information and a time domain resource indicated by the second information are alternately arranged;

when both the first information and the second information in the target information are time domain resource information, and the first information and the second information are arranged sequentially, all time domain resources indicated by the first information are arranged before or after the time domain resource indicated by the second information;

when both the first information and the second information in the target information are frequency domain resource information, and the first information and the second information are arranged alternately, a frequency domain resource indicated by the first information and a frequency domain resource indicated by the second information are arranged alternately;

when both the first information and the second information in the target information are frequency domain resource information, and the first information and the second information are arranged sequentially, frequencies of all frequency domain resources indicated by the first information are greater than or less than frequency domain resources indicated by the second information;

when both the first information and the second information in the target information are spatial domain resource information, and the first information and the second information are arranged alternately, a spatial domain resource indicated by the first information and a spatial domain resource indicated by the second information are arranged alternately in terms of a serial number;

when both the first information and the second information in the target information are spatial domain resource information, and the first information and the second information are arranged sequentially, serial numbers of all spatial domain resources indicated by the first information are before or after a serial number of the spatial domain resource indicated by the second information;

when both the first information and the second information in the target information are bit information, and the first information and the second information are arranged alternately, a bit indicated by the first information and a bit indicated by the second information are arranged alternately:

when both the first information and the second information in the target information are bit information, and the first information and the second information are arranged sequentially, all bits indicated by the first information are before or after the bit indicated by the second information.

2. The method according to claim 1, wherein, after the obtaining wake-up information according to the target information, the method further comprises:

determining whether to receive physical downlink shared channel (PDSCH) according to the indication of the wake-up information.

3. The method according to claim 2, wherein the determining whether to receive the PDSCH according to the indication of the wake-up information comprises:

if the wake-up information obtained according to the target information includes at least one of the node group-level wake-up information or the node-level wake-up information, receiving PDSCH scheduled by downlink control information (DCI) scrambled by Paging-Radio Network Temporary Identity (P-RNTI); otherwise, not receiving the PDSCH scheduled by the DCI scrambled by the P-RNTI.

4. The method according to claim 1, wherein the cell-level wake-up information is further used to indicate a type of information to be received including the cell-level information.

5. The method according to claim 4, wherein the cell-level information includes at least one of a broadcast message, the short message, or other information of PDSCH scheduled by DCI not scrambled by P-RNTI.

6. The method according to claim 1, wherein the area-level information includes at least one of a broadcast message, the short message, or other information of PDSCH scheduled by DCI not scrambled by P-RNTI.

7. The method according to claim 6, wherein the short message includes at least one of system message update, an alert message or a first message;

wherein the first message is used to instruct the node to stop monitoring Paging Occasion (PO).

8. The method according to claim 1, wherein the node group-level information includes at least one of a broadcast message, the short message, a paging message, other information of PDSCH scheduled by DCI scrambled by P-RNTI or other information of PDSCH scheduled by DCI not scrambled by P-RNTI.

9. The method according to claim 1, wherein the node-level information includes at least one of a paging message or other information of PDSCH scheduled by DCI scrambled by P-RNTI.

10. The method according to claim 1, wherein the monitoring parameter includes at least one of a core resource set (CORESET) resource, a search space resource, a physical downlink control channel (PDCCH) candidate resource, a symbol of the CORESET resource, or a resource block of the CORESET resource.

11. A signal sending method, applied to a network side device, comprising:

configuring target information, wherein the target information includes first information, or first information and second information;

sending wake-up information through the target information, wherein the wake-up information sent through the first information includes at least one of area-level wake-up information, cell-level wake-up information, or node group-level wake-up information, wake-up information sent through the second information includes at least one of the node group-level wake-up information or node-level wake-up information;

wherein when the first information includes first sequence information and the second information includes second sequence information, the first sequence information and the second sequence information are configured to indicate the wake-up information;

wherein the area-level wake-up information is used to indicate at least one of the following:

whether area-level information exists;

whether to wake up all nodes in a target area to receive the area-level information;

waking up all nodes in the target area to receive the area-level information;

a type of information to be received including the area-level information;

a type of a short message;

a type of a system message to be updated; or whether to update the system message;

wherein the cell-level wake-up information is used to indicate at least one of the following:

whether cell-level information exists;

whether to wake up all nodes in a target area to receive the cell-level information;

waking up all nodes in the target area to receive the cell-level information;

a type of a short message;

a type of a system message to be updated; or whether to update the system message;

wherein the node group-level wake-up information is used to indicate at least one of the following:

whether node group-level information exists;

whether to wake up all nodes in a target node group to receive the node group-level information;

waking up all nodes in the target node group to receive the node group-level information;

a type of information to be received including the node group-level information;

a serial number of a node group to be woken up; or whether to wake up at least one node group;

wherein the node-level wake-up information is used to indicate at least one of the following:

whether node-level information exists;

whether to wake up a target node to receive the node-level information;

waking up the target node to receive the node-level information;

a type of information to be received including the node-level information;

a serial number of a node to be woken up; or whether to wake up at least one node;

wherein the first information and the second information in the target information are arranged alternately or sequentially;

wherein when both the first information and the second information in the target information are time domain resource information, and the first information and the second information are arranged alternately, a time domain resource indicated by the first information and a time domain resource indicated by the second information are alternately arranged;

when both the first information and the second information in the target information are time domain resource information, and the first information and the second information are arranged sequentially, all time domain resources indicated by the first information are arranged before or after the time domain resource indicated by the second information;

when both the first information and the second information in the target information are frequency domain resource information, and the first information and the second information are arranged alternately, a frequency domain resource indicated by the first information and a frequency domain resource indicated by the second information are arranged alternately;

when both the first information and the second information in the target information are frequency domain resource information, and the first information and the second information are arranged sequentially, frequencies of all frequency domain resources indicated by the first information are greater than or less than frequency domain resources indicated by the second information;

when both the first information and the second information in the target information are spatial domain resource information, and the first information and the second information are arranged alternately, a spatial domain resource indicated by the first information and a spatial domain resource indicated by the second information are arranged alternately in terms of a serial number;

when both the first information and the second information in the target information are spatial domain resource information, and the first information and the second information are arranged sequentially, serial numbers of all spatial domain resources indicated by the first information are before or after a serial number of the spatial domain resource indicated by the second information;

when both the first information and the second information in the target information are bit information, and the first information and the second information are arranged alternately, a bit indicated by the first information and a bit indicated by the second information are arranged alternately;

when both the first information and the second information in the target information are bit information, and the first information and the second information are arranged sequentially, all bits indicated by the first information are before or after the bit indicated by the second information.

12. A network side device, comprising: a transceiver, a memory, a processor, and a computer program stored in the memory and executed by the processor, wherein the processor executes the computer program to implement the following steps according to the signal sending method of claim 11:

configuring target information, wherein the target information includes first information, or first information and second information;

sending wake-up information through the target information, wherein the wake-up information sent through the first information includes at least one of area-level wake-up information, cell-level wake-up information, or node group-level wake-up information, wake-up information sent through the second information includes at least one of the node group-level wake-up information or node-level wake-up information;

wherein when the first information includes first sequence information and the second information includes second sequence information, the first sequence information and the second sequence information are configured to indicate the wake-up information;

wherein the area-level wake-up information is used to indicate at least one of the following:

whether area-level information exists;

whether to wake up all nodes in a target area to receive the area-level information;

waking up all nodes in the target area to receive the area-level information;

a type of information to be received including the area-level information;

a type of a short message;

a type of a system message to be updated; or whether to update the system message;

wherein the cell-level wake-up information is used to indicate at least one of the following:

whether cell-level information exists;
whether to wake up all nodes in a target area to receive the cell-level information;
waking up all nodes in the target area to receive the cell-level information;
a type of a short message;
a type of a system message to be updated; or
whether to update the system message;
wherein the node group-level wake-up information is used to indicate at least one of the following:
whether node group-level information exists;
whether to wake up all nodes in a target node group to receive the node group-level information;
waking up all nodes in the target node group to receive the node group-level information;
a type of information to be received including the node group-level information;
a serial number of a node group to be woken up; or
whether to wake up at least one node group;
wherein the node-level wake-up information is used to indicate at least one of the following:
whether node-level information exists;
whether to wake up a target node to receive the node-level information;
waking up the target node to receive the node-level information;
a type of information to be received including the node-level information;
a serial number of a node to be woken up; or
whether to wake up at least one node;
wherein the first information and the second information in the target information are arranged alternately or sequentially;
wherein when both the first information and the second information in the target information are time domain resource information, and the first information and the second information are arranged alternately, a time domain resource indicated by the first information and a time domain resource indicated by the second information are alternately arranged;
when both the first information and the second information in the target information are time domain resource information, and the first information and the second information are arranged sequentially, all time domain resources indicated by the first information are arranged before or after the time domain resource indicated by the second information;
when both the first information and the second information in the target information are frequency domain resource information, and the first information and the second information are arranged alternately, a frequency domain resource indicated by the first information and a frequency domain resource indicated by the second information are arranged alternately;
when both the first information and the second information in the target information are frequency domain resource information, and the first information and the second information are arranged sequentially, frequencies of all frequency domain resources indicated by the first information are greater than or less than frequency domain resources indicated by the second information;
when both the first information and the second information in the target information are spatial domain resource information, and the first information and the second information are arranged alternately, a spatial domain resource indicated by the first information and a spatial domain resource indicated by the second information are arranged alternately in terms of a serial number;
when both the first information and the second information in the target information are spatial domain resource information, and the first information and the second information are arranged sequentially, serial numbers of all spatial domain resources indicated by the first information are before or after a serial number of the spatial domain resource indicated by the second information;
when both the first information and the second information in the target information are bit information, and the first information and the second information are arranged alternately, a bit indicated by the first information and a bit indicated by the second information are arranged alternately;
when both the first information and the second information in the target information are bit information, and the first information and the second information are arranged sequentially, all bits indicated by the first information are before or after the bit indicated by the second information.

13. A node, comprising: a transceiver, a memory, a processor, and a computer program stored on the memory and executed by the processor, wherein the processor executes the computer program to implement the following steps:
obtaining target information, wherein the target information includes first information, or first information and second information;
obtaining wake-up information according to the target information, wherein the wake-up information obtained according to the first information includes at least one of area-level wake-up information, cell-level wake-up information, or node group-level wake-up information, wake-up information obtained according to the second information includes at least one of the node group-level wake-up information and node-level wake-up information;
performing waking up or continuing to sleep according to indication of the wake-up information;
wherein when the first information includes first sequence information and the second information includes second sequence information, the first sequence information and the second sequence information are configured to indicate the wake-up information;
wherein the area-level wake-up information is used to indicate at least one of the following:
whether area-level information exists;
whether to wake up all nodes in a target area to receive the area-level information;
waking up all nodes in the target area to receive the area-level information;
a type of information to be received including the area-level information;
a type of a short message;
a type of a system message to be updated; or
whether to update the system message;
wherein the cell-level wake-up information is used to indicate at least one of the following:
whether cell-level information exists;
whether to wake up all nodes in a target area to receive the cell-level information;
waking up all nodes in the target area to receive the cell-level information;
a type of a short message;

a type of a system message to be updated; or whether to update the system message;

wherein the node group-level wake-up information is used to indicate at least one of the following:

whether node group-level information exists;

whether to wake up all nodes in a target node group to receive the node group-level information;

waking up all nodes in the target node group to receive the node group-level information;

a type of information to be received including the node group-level information;

a serial number of a node group to be woken up; or whether to wake up at least one node group;

wherein the node-level wake-up information is used to indicate at least one of the following:

whether node-level information exists;

whether to wake up a target node to receive the node-level information;

waking up the target node to receive the node-level information;

a type of information to be received including the node-level information;

a serial number of a node to be woken up; or whether to wake up at least one node;

wherein the first information and the second information in the target information are arranged alternately or sequentially;

wherein when both the first information and the second information in the target information are time domain resource information, and the first information and the second information are arranged alternately, a time domain resource indicated by the first information and a time domain resource indicated by the second information are alternately arranged;

when both the first information and the second information in the target information are time domain resource information, and the first information and the second information are arranged sequentially, all time domain resources indicated by the first information are arranged before or after the time domain resource indicated by the second information;

when both the first information and the second information in the target information are frequency domain resource information, and the first information and the second information are arranged alternately, a frequency domain resource indicated by the first information and a frequency domain resource indicated by the second information are arranged alternately;

when both the first information and the second information in the target information are frequency domain resource information, and the first information and the second information are arranged sequentially, frequencies of all frequency domain resources indicated by the first information are greater than or less than frequency domain resources indicated by the second information;

when both the first information and the second information in the target information are spatial domain resource information, and the first information and the second information are arranged alternately, a spatial domain resource indicated by the first information and a spatial domain resource indicated by the second information are arranged alternately in terms of a serial number;

when both the first information and the second information in the target information are spatial domain resource information, and the first information and the second information are arranged sequentially, serial numbers of all spatial domain resources indicated by the first information are before or after a serial number of the spatial domain resource indicated by the second information;

when both the first information and the second information in the target information are bit information, and the first information and the second information are arranged alternately, a bit indicated by the first information and a bit indicated by the second information are arranged alternately;

when both the first information and the second information in the target information are bit information, and the first information and the second information are arranged sequentially, all bits indicated by the first information are before or after the bit indicated by the second information.

* * * * *